(12) United States Patent
Cahan et al.

(10) Patent No.: US 12,466,750 B2
(45) Date of Patent: Nov. 11, 2025

(54) SMALL BIO-REACTOR PLATFORM (SBP) TECHNOLOGY AS MICROBIAL ELECTROCHEMICAL SYSTEMS

(71) Applicants: ARIEL SCIENTIFIC INNOVATIONS LTD., Ariel (IL); BIO CASTLE WATER TECHNOLOGIES LTD., Shimshit (IL)

(72) Inventors: Rivka Cahan, Petach Tikva (IL); Alex Schechter, Givat Koah (IL); Ofir Menashe, Shimshit (IL); Irina Dubrovin, Ariel (IL)

(73) Assignees: ARIEL SCIENTIFIC INNOVATIONS LTD., Ariel (IL); BIO CASTLE WATER TECHNOLOGIES LTD., Shimshit (IL)

(*) Notice: Subject to any disclaimer, the term of this patent is extended or adjusted under 35 U.S.C. 154(b) by 482 days.

(21) Appl. No.: 18/018,225

(22) PCT Filed: Jul. 28, 2021

(86) PCT No.: PCT/IL2021/050911
§ 371 (c)(1),
(2) Date: Jan. 26, 2023

(87) PCT Pub. No.: WO2022/024123
PCT Pub. Date: Feb. 3, 2022

(65) Prior Publication Data
US 2023/0339791 A1 Oct. 26, 2023

Related U.S. Application Data

(60) Provisional application No. 63/057,311, filed on Jul. 28, 2020.

(51) Int. Cl.
*C02F 3/00* (2023.01)
*C25B 1/04* (2021.01)
(Continued)

(52) U.S. Cl.
CPC .............. *C02F 3/005* (2013.01); *C25B 1/04* (2013.01); *C25B 11/031* (2021.01); *C25B 11/04* (2013.01); *H01M 8/16* (2013.01); *C02F 2209/08* (2013.01)

(58) Field of Classification Search
None
See application file for complete search history.

(56) References Cited

U.S. PATENT DOCUMENTS

2007/0122397 A1 5/2007 Sanguansri et al.
2011/0039164 A1 2/2011 Akers et al.
(Continued)

FOREIGN PATENT DOCUMENTS

WO 2001036590 A1 5/2001
WO 2010122545 A1 10/2010
WO 2011025021 A1 3/2011

OTHER PUBLICATIONS

Berthiaume, Laura. Investigating the structure and composition of anode-associated biofilms in electrochemical systems. Diss. Toronto Metropolitan University, 2011. (Year: 2011).*

(Continued)

*Primary Examiner* — Luan V Van
(74) *Attorney, Agent, or Firm* — The Roy Gross Law Firm, LLC; Roy D. Gross

(57) ABSTRACT

The present invention is directed to an anode comprising an inner layer encapsulating a conductive material and a bacteria, and an outer layer comprising a rigid porous membrane. Further provided is a microbial electrochemical system comprising the herein disclosed anode, and methods of using the same, such as for treating wastewater, waste, hydrogen production, or generating electricity.

20 Claims, 11 Drawing Sheets

(51) Int. Cl.
*C25B 11/031* (2021.01)
*C25B 11/04* (2021.01)
*H01M 8/16* (2006.01)

(56) References Cited

U.S. PATENT DOCUMENTS

2011/0229930 A1 9/2011 Menashe
2019/0112212 A1 4/2019 Silver et al.

OTHER PUBLICATIONS

Gandu, B., Rozenfeld, S., Ouaknin Hirsch, L., Schechter, A., & Cahan, R. (2020). Immobilization of bacterial cells on carbon-cloth anode using alginate for hydrogen generation in a microbial electrolysis cell. Journal of Power Sources, 455, 227986. doi: 10.1016/j.jpowsour.2020.227986.
David Pinto. Electronic transfer within a microbial fuel cell. Better understanding of Experimental and Structural Parameters at the Interface between Electro-active Bacteria and Carbon-based Electrodes. Material chemistry. Université Pierre et Marie Curie—Paris VI, 2016. English. NNT: 2016PA066367.
PCT International Search Report for International Application No. PCT/IL2021/050911, mailed Nov. 17, 2021, 4pp.
PCT Written Opinion for International Application No. PCT/IL2021/050911, mailed Nov. 17, 2021, 6pp.
PCT International Preliminary Report on Patentability for International Application No. PCT/IL2021/050911, issued Jan. 31, 2023, 7pp.

* cited by examiner

SMALL BIO-REACTOR PLATFORM (SBP) TECHNOLOGY AS MICROBIAL ELECTROCHEMICAL SYSTEMS

CROSS REFERENCE TO RELATED APPLICATIONS

This application is a National Phase of PCT Patent Application No. PCT/IL2021/050911 having International filing date of Jul. 28, 2021, which claims the benefit of priority to U.S. Provisional Patent Application No. 63/057,311 filed Jul. 28, 2020, entitled "SMALL BIO-REACTOR PLATFORM (SBP) TECHNOLOGY AS MICROBIAL ELECTROCHEMICAL SYSTEMS" the contents of which are all incorporated herein by reference in their entirety.

FIELD OF THE INVENTION

The present invention is in the field of microbial electrochemical systems.

BACKGROUND OF THE INVENTION

Microbial electrochemical systems (MESs) have been extensively investigated in the past decade, due to their great potential for use in wastewater treatment and energy recovery applications. MESs can be broadly classified either as a microbial fuel cell (MFC) or a microbial electrolysis cell (MEC).

While development of these devices holds great promise for progress towards new energy technologies, certain applications are limited. The performance of a MES strongly relies on the activity and efficacy of the bacterial anode, which is considered the limiting element. The anode properties require a high surface area for electrogenic biofilm formation, functional groups that will support the sustainable attachment of the bacteria to the surface, and high conductivity to support effective electron transfer from the bacteria to the anode material. To date, there are no effective methods in the literature which show to actively protect and promote the electrogenic culture. Thus, there is a continuing need for development of methods and effective formulations for microbial electrochemical systems, emphasis on selective electrogenic biomass accumulation over time and improvement the interaction between the electrogenic bacteria and the conductive surface of the anode.

SUMMARY OF THE INVENTION

According to one aspect, the present invention provides an anode comprising: (i) an inner layer encapsulating a conductive material and a microorganism, wherein the inner layer is water soluble; (ii) an outer layer comprising a rigid porous membrane, the outer layer encapsulating the inner layer; and (iii) a metal conductor, wherein the metal conductor is positioned across the outer layer, the inner layer and in contact with the conductive material.

In some embodiments, the rigid porous membrane is substantially water insoluble.

In some embodiments, the rigid porous membrane is characterized by a pore size between 0.1 μm and 1 μm.

In some embodiments, the inner layer comprises a water soluble polymer selected from the group consisting of: gelatin, dextran, collagen, alginate, chitosan, agarose, poly ethers, poly vinyl alcohol, carrageenan, agar, and any combination thereof.

In some embodiments, the rigid porous membrane is characterized by a tensile strength between 1 MPa and 100 MPa.

In some embodiments, the rigid porous membrane is selected from the group consisting of: cellulose, cellulose ester, polyethylene glycol (PEG), polyvinyl-alcohol (PVAL), polyethersulfone (PES), cellulose acetate, cellulose nitrate, ethyl cellulose, nitrocellulose mixed esters, polycarbonate film, nylon, poly(vinylidene fluoride) (PVDF), polysulfone, and any combination thereof.

In some embodiments, the anode is in the form of a particle characterized by a particle size between 0.5 cm and 30 cm.

In some embodiments, the microorganism is deposited on at least one surface of the conductive material.

In some embodiments, the microorganism is a genetically modified microorganism.

In some embodiments, the genetically modified microorganism is characterized by exoelectrogenic activity.

In some embodiments, the microorganism is selected from bacteria, archaea, algae, yeast, mold and fungi.

In some embodiments, the bacteria comprises a dry culture bacteria, endospores culture bacteria, or viable culture bacteria.

In some embodiments, the bacteria is an exoelectrogenic bacteria selected from *Geobacteraceae*, *Shewanellaceae*, *Aeromonadaceae*, *Alteromonadaceae*, *Clostridiaceae*, *Comamonadaceae*, *Desulfuromonaceae*, *Enterobacteriaceae*, *Pasturellaceae*, and *Pseudomonadaceae*.

In some embodiments, the conductive material comprises a conducting redox polymer, carbon nanotube (CNT), graphene, activated carbon, carbon paper, carbon cloth, carbon felt, carbon wool, carbon foam, graphite, porous graphite, graphite powder, graphite granules, graphite fiber, electron conductive polymers, metal, process stimulators and accelerators, or any combination thereof.

In some embodiments, the anode comprises at least two of the metal conductor.

In some embodiments, the at least two of the metal conductor are positioned parallel to each other.

In some embodiments, the metal conductor comprises silver, copper, gold, platinum, or any combination thereof.

In some embodiments, the anode is characterized by an improved electrogenic activity.

According to another aspect, the present invention provides a microbial electrochemical system comprising the anode of the present invention, and a cathode.

In some embodiments, the microbial electrochemical system comprises more than 2 of the anode, wherein the anode are in contact through the metal conductor.

In some embodiments, the microbial electrochemical system comprises a single-chamber or a dual chamber.

In some embodiments, the microbial electrochemical system is for use in wastewater (WW) treatment, waste treatment, electricity generation, energy generation, hydrogen production, or any combination thereof.

In some embodiments, the microbial electrochemical system is characterized by an improved chemical oxygen demand (COD) removal capacity.

In some embodiments, the microbial electrochemical system is characterized by chemical oxygen demand (COD) removal in the range of 30% to 99%.

According to another aspect, the present invention provides a method comprising: (i) providing the microbial electrochemical system of the present invention; (ii) contacting the microbial electrochemical system with a carbon source; and (iii) providing an electric current to the microbial electrochemical system.

In some embodiments, the method is for WW treatment, water treatment, waste treatment, hydrogen production, electricity generation, or any combination thereof.

In some embodiments, the method further comprises a step preceding step (ii), comprising contacting the anode with an aqueous solution, thereby activating the anode.

In some embodiments, the anode is substantially devoid of the inner layer.

In some embodiments, the carbon source comprises wastewater, acetate, acetic acid, citric acid, citrate, or any combination thereof.

In some embodiments, the microbial electrochemical system is characterized by COD removal in the range of 30% to 99%.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In addition to the exemplary aspects and embodiments described above, further aspects and embodiments will become apparent by reference to the figures and by study of the following detailed description.

DETAILED DESCRIPTION OF THE INVENTION

Figure 1A:
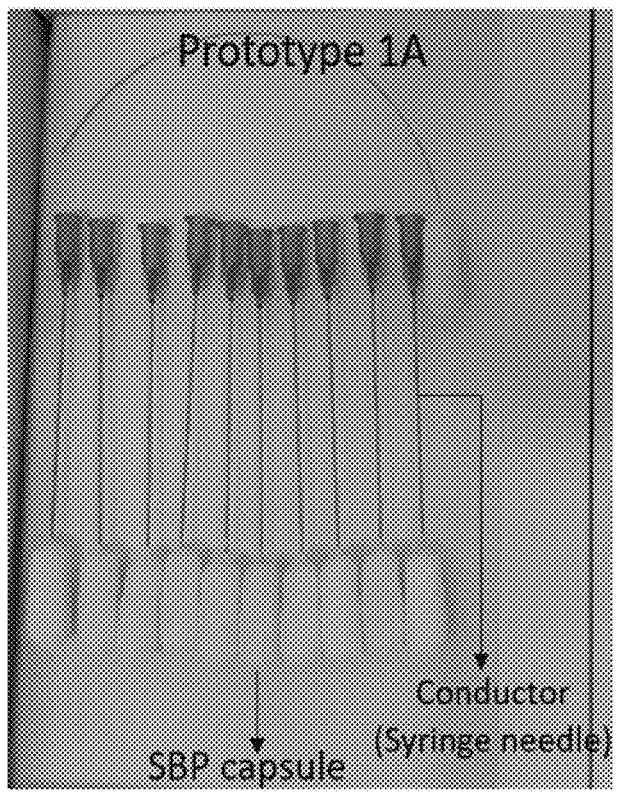
FIGS. 1A-D present pictures of the anode prototype 1A (FIG. 1A), anode prototype 1B (FIG. 1B), testing system 1 (FIG. 1C) and testing system 2 (FIG. 1D)

According to some embodiments, the present invention provides an anode. In some embodiments, the present invention provides an anode comprising an inner layer encapsulating a conductive material and a microorganism, and an outer layer comprising a rigid porous membrane. In some embodiments, the outer layer encapsulates the inner layer. In some embodiments, the microorganism comprises exoelectrogenic bacteria. In some embodiments, the anode comprises a metal conductor. In some embodiments, the metal conductor is positioned across the outer layer, the inner layer and in contact with the conductive material.

According to some embodiments, the present invention provides a method of treating wastewater and/or generating an energy from wastewater or other forms of waste, using the anode of the present invention. In some embodiments, the anode is for use in microbial full cell (MFC). In some embodiments, the anode is for use in microbial electrolysis cell (MEC).

According to some embodiments, the present invention provides a microbial electrochemical system comprising the anode described herein. In some embodiments, the anode comprises an inner membrane (inner layer) soluble in water as an internal protective layer. In some embodiments, the anode comprises a rigid and permeable microfiltration membrane (outer layer) insoluble in water as an outer protective layer. In some embodiments, the permeable microfiltration membrane stabilizes the anode structure and allows biofilm growth close to the conductor. In some embodiments, the bacteria are exoelectrogenic by nature or by genetic modification that provides electrogenic activity to the bacteria.

The present invention is based, in-part, on the surprising findings that the rigid outer membrane (outer layer) provides protection for the anode in extreme hostile environments, such as in wastewater treatment bioreactors medium (i.e., shear forces and high friction conditions). In some embodiments, the anode is characterized by an improved resistance and improved stability in hostile environments. In addition, the outer membrane prevents from unwanted microorganisms to penetrate from the outer environment to the inner medium thus, avoiding negative interactions between the exoelectrogenic bacteria and other microorganisms (i.e., non-exoelectrogenic and competition). Since the exoelectrogenic bacteria is not able to traffic across the outer membrane into the outer environment, long term exoelectrogenic biomass accumulation close to the conductor is possible, thereby improving process yield.

In some embodiments, the inner membrane is used as a scaffold for the production of the rigid porous membrane. In some embodiments, the inner membrane provides protection to the microorganism from humidity and oxygen.

The Anode

According to some embodiments, there is provided an anode comprising: (i) an inner layer encapsulating a conductive material and a microorganism; and (ii) an outer layer comprising a rigid porous membrane, the outer layer encapsulating the inner layer.

According to some embodiments, there is provided an anode comprising: (i) an inner layer encapsulating a conductive material and a microorganism, wherein the inner layer is water soluble; (ii) an outer layer comprising a rigid porous membrane, the outer layer encapsulating the inner layer; and (iii) a metal conductor, wherein the metal conductor is positioned across the outer layer, the inner layer and in contact with the conductive material.

In some embodiments, the rigid porous membrane is substantially water insoluble. As used herein, the term "water insoluble" refers to a material that, when exposed to an excess of water, does not dissolve, but may disperse to varying degrees. In some embodiments the term "insoluble" refers to a material that is less than 10%, less than 5%, less than 2%, or less than 1% soluble in water and/or aqueous solution. In some embodiments, "insoluble" refers to a material that can be partially dissolved in water and/or aqueous solution only at a concentration of less than 0.01% by weight.

In some embodiments, the polymer of the rigid porous membrane is characterized by water solubility of at most 0.5 g/L, at most 0.3 g/L, at most 0.2 g/L, at most 0.1 g/L, at most 0.05 g/L, at most 0.01 g/L, at most 0.005 g/L, at most 0.001 g/L, at most 0.0001 g/L, at most 0.00001 g/L, including any value therebetween. Each possibility represents a separate embodiment of the present invention.

In some embodiments, the pore size of the rigid porous membrane is maintained, following incubation in water. In some embodiments, the rigid porous membrane is characterized by a capacity to withstand harsh unstable environments (e.g., pH variations).

In some embodiments, the rigid porous membrane is characterized by a pore size between 0.1 µm and 1 µm, 0.1 µm and 0.95 µm, 0.1 µm and 0.9 µm, 0.1 µm and 0.85 µm, 0.1 µm and 0.8 µm, 0.1 µm and 0.7 µm, 0.1 µm and 0.6 µm, 0.1 µm and 0.5 µm, 0.2 µm and 1 µm, 0.2 µm and 0.95 µm, 0.2 µm and 0.9 µm, 0.2 µm and 0.85 µm, 0.2 µm and 0.8 µm, 0.22 µm and 0.7 µm, 0.2 µm and 0.6 µm, 0.2 µm and 0.5 µm, 0.3 µm and 1 µm, 0.3 µm and 0.95 µm, 0.3 µm and 0.9 µm, 0.3 µm and 0.85 µm, 0.3 µm and 0.8 µm, 0.3 µm and 0.7 µm, 0.3 µm and 0.6 µm, 0.3 µm and 0.5 µm, 0.4 µm and 1 µm, 0.4 µm and 0.95 µm, 0.4 µm and 0.9 µm, 0.4 µm and 0.85 µm, 0.4 µm and 0.8 µm, 0.4 µm and 0.7 µm, 0.4 µm and 0.6 µm, or between 0.4 µm and 0.5 µm, including any range therebetween. Each possibility represents a separate embodiment of the invention.

In some embodiments, the rigid porous membrane is characterized by a thickness between 1 µm and 1000 µm, between 1 µm and 900 µm, between 1 µm and 650 µm, between 1 µm and 600 µm, between 1 µm and 500 µm, 10 µm and 1000 µm, between 10 µm and 900 µm, between 10 µm and 650 µm, between 10 µm and 600 µm, between 10 µm and 500 µm, 100 µm and 1000 µm, between 100 µm and 900 µm, between 100 µm and 650 µm, between 100 µm and 600 µm, between 100 µm and 500 µm, 400 µm and 1000 µm, between 400 µm and 900 µm, between 400 µm and 650 µm, or between 400 µm and 600 µm, including any range therebetween. Each possibility represents a separate embodiment of the invention.

In some embodiments, the rigid porous membrane is characterized by a tensile strength between 1 MPa and 500 MPa, between 1 MPa and 400 MPa, between 1 MPa and 250 MPa, between 1 MPa and 100 MPa, between 1 MPa and 50 MPa, 10 MPa and 500 MPa, between 10 MPa and 400 MPa, between 10 MPa and 250 MPa, between 10 MPa and 100 MPa, between 10 MPa and 50 MPa, 90 MPa and 500 MPa, between 90 MPa and 400 MPa, or between 90 MPa and 250 MPa, including any range therebetween. Each possibility represents a separate embodiment of the invention.

As used herein the term "rigid" refers to a stiff and inflexible material. In some embodiments rigid material refers to a solid material. Rigidity is the property exhibited by a material to change in its shape. A material is considered rigid, when an external force is applied to a material and the material is able to maintain its shape.

In some embodiments, the rigid porous membrane is selected from the group consisting of: cellulose, cellulose ester, polyethylene glycol (PEG), polyvinyl-alcohol (PVAL), polyethersulfone (PES), cellulose acetate, cellulose nitrate, ethyl cellulose, nitrocellulose mixed esters, polycarbonate film, nylon, poly(vinylidene fluoride) (PVDF), polysulfone, and any combination thereof.

In some embodiments, the rigid porous membrane comprises a polymer comprising cellulose acetate. In some embodiments, the rigid porous membrane comprises a polymer comprising ethyl cellulose.

In some embodiments, the rigid porous membrane comprises a single polymer, a co-polymer, or blend thereof. In some embodiments, the rigid porous membrane comprises a plurality of different polymers.

In some embodiments, the rigid porous membrane is resistant to biofilm formation. In some embodiments, the rigid porous membrane comprises a polymer resistant to degradation and allowing anode persistence over long period of time.

In some embodiments, the rigid porous membrane is selected such that it allows trafficking of molecules of a particular size (e.g., water molecules or proteins) while inhibiting trafficking of molecules of a larger size (e.g., microorganisms).

In some embodiments, the anode is in the form of a particle characterized by a particle size between 0.5 cm and 30 cm, between 1 cm and 30 cm, between 2 cm and 30 cm, between 2.5 cm and 30 cm, between 5 cm and 30 cm, between 0.5 cm and 15 cm, between 1 cm and 15 cm, between 2 cm and 15 cm, between 2.5 cm and 15 cm, or between 5 cm and 15 cm, including any range therebetween. Each possibility represents a separate embodiment of the invention.

In some embodiments, the particle has a shape selected from a spherical shape, elliptical shape, and cylindrical shape. In some embodiments, the particle has a length dimension (e.g., along a longitudinal axis of the particle) between 0.5 cm and 30 cm, between 1 cm and 30 cm, between 2 cm and 30 cm, between 2.5 cm and 30 cm, between 5 cm and 30 cm, between 0.5 cm and 15 cm, between 1 cm and 15 cm, between 2 cm and 15 cm, between 2.5 cm and 15 cm, or between 5 cm and 15 cm, including any range therebetween. Each possibility represents a separate embodiment of the invention. In some embodiments, the particle has a width dimension (e.g. perpendicular to a longitudinal axis of the particle) in the range of 0.01 cm to 10 cm, 0.1 cm to 10 cm, or 1 cm to 10 cm, including any range therebetween. Each possibility represents a separate embodiment of the invention. The term "particle" as used herein refers to an enclosed structure (e.g. capsule). The particle of the present invention may be of various shapes and sizes depending on the intended use of the particle (described in further detail below). Thus, the particle may be about 0.5 cm, 1 cm, 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 25 cm, 30 cm, 35 cm or 40 cm in length.

In some embodiments, the conductive material comprises a conducting redox polymer, carbon nanotube (CNT), graphene, activated carbon, carbon paper, carbon cloth, carbon felt, carbon wool, carbon foam, graphite, porous graphite, graphite powder, graphite granules, graphite fiber, electron conductive polymers (e.g., polythiophene, polyaniline), metal, metal mixture, process stimulators and accelerators and any combination thereof.

According to some embodiments, there is provided an anode comprising an inner layer encapsulating a conductive material and a microorganism. In some embodiments, the inner layer is substantially water soluble. In some embodiments, the inner layer comprises a water-soluble polymer. As used herein, the term "water-soluble polymer" refers to a polymer that dissolves in an aqueous medium after one week of incubation therein, 5 day incubation, 1 day incubation, 12 hour incubation, 8 hour incubation, 5 hour incubation, 1 hour incubation, 40 minutes incubation, 30 minutes incubation, 20 minutes incubation, 10 minutes incubation, 5 minutes incubation, or 1 minute incubation therein, including any value therebetween. Each possibility represents a separate embodiment of the invention. The water-soluble polymer may be a natural water-soluble polymer or a synthetic water-soluble polymer. Examples of such include, but are not limited to, gelatin, agar, polyethylene glycol, acrylic acid polymers, polysaccharide, polysaccharide gum and sodium alginate. It will be appreciated that the inner layer may be fabricated from one polymer, from two polymers, from three polymers or from several polymers as can be determined by one of ordinary skill in the art. In some embodiments, the inner layer comprises a water-soluble polymer selected from gelatin, dextran, collagen, alginate, chitosan, agarose, poly ethers, poly vinyl alcohol, carrageenan, agar, and any combination thereof. In some embodiments, the inner membrane comprises gelatin.

In some embodiments, the inner layer is characterized by water solubility of at least 0.01 g/L, at least 0.1 g/L, at least 0.5 g/L, at least 2 g/L, at least 5 g/L, at least 10 g/L, at least 20 g/L, at least 50 g/L, including any range between. Each possibility represents a separate embodiment of the present invention.

In some embodiments, the inner layer is characterized by a thickness between 1 μm and 500 μm, 5 μm and 500 μm, 10 μm and 500 μm, 30 μm and 500 μm, 50 μm and 500 μm, 70 μm and 500 μm, 100 μm and 500 μm, 250 μm and 500 μm, 1 μm and 400 μm, 5 μm and 400 μm, 10 μm and 400 μm, 30 μm and 400 μm, 50 μm and 400 μm, 70 μm and 400 μm, 100 μm and 400 μm, 250 μm and 400 μm, 1 μm and 300 μm, 5 μm and 300 μm, 10 μm and 300 μm, 30 μm and 300 μm, 50 μm and 300 μm, 70 μm and 300 μm, 100 μm and 300 μm, 250 μm and 300 μm, 1 μm and 200 μm, 5 μm and 200 μm, 10 μm and 200 μm, 30 μm and 200 μm, 50 μm and 200 μm, 70 μm and 200 μm, or between 100 μm and 200 μm, including any range therebetween. Each possibility represents a separate embodiment of the present invention.

It will be appreciated that additional elements may be incorporated into the inner membrane. These may include glass or polymer beads, activated carbon granules, activated carbon chips, enzymes and nutrients (see for example patent application No. PCT/IL2010/256) and other microorganism that do not have an exoelectrogenic activity, however, can secrete biostimulators of other materials that can contribute or accelerate the bioelectrical activity. The material of the inner membrane and components comprised therein may be selected to support biofilm formation. As used herein the term "biofilm" refers to is an aggregate of microorganisms in which cells adhere to each other and/or to a surface. These adherent cells are frequently embedded within a self-produced matrix of extracellular polymeric substance (EPS) in which microorganisms are dispersed and/or form colonies.

The biofilm typically is made of polysaccharides and other macromolecules. Biofilm formation may occur, for example, on the surface of the inner core (e.g., on the conductive material), on the inside surface of the inner layer (e.g. on the inner surface of the gelatin membrane), as well as on the additional components (e.g. on the surface of the glass beads or on the surface of the carbon granules/chips). Thus, the number of additional components may be selected according to the level of biofilm formation required. In addition, the number of additional components may be selected according to the weight/buoyancy required.

In some embodiments, the microorganism is deposited on at least one surface of the conductive material. In some embodiments, in order to support microorganism growth, the conductive material may comprise additional nutrients as described hereinabove. In some embodiments, the conductive material comprises a microorganism (e.g., bacterial) growth supportive capacity.

In some embodiments, the inner layer contains sufficient nutrients to facilitate viability and growth of the microorganisms contained within the particle for at least 5 days, at least 10 days, at least 20 days, or at least 30 days, including any value therebetween. Each possibility represents a separate embodiment of the present invention. Particular compositions (e.g., matrixes and nutrients) suitable for use in growing microorganisms are well known in the art. For example, the inner core may comprise an agar including e.g. Luria Agar (LA), LB (Luria Bertani) Agar, MacConkey Agar, Miller's LB Agar, Blood agar, Chocolate agar, Hektoen enteric agar (HE), mannitol salt agar (MSA) and the like, or gelatin.

In some embodiments, the inner layer and/or conductive material may comprise additional nutrients which support microorganism growth and/or which augment the microorganism activity (e.g. decontaminating activity). Thus, the inner layer and/or conductive material may comprise, for example, a source of amino acids and nitrogen (e.g., beef, yeast extract, tryptone), a sugar or carbon source (e.g. glucose), water, various salts (e.g. NaCl), essential elements (e.g. iron, magnesium, nitrogen, phosphorus, and sulfur), other compounds (e.g. lactate) and enzymes (e.g. degradation enzymes). The inner layer may additionally comprise any nutrient needed for the microorganism growth and prosperity.

In some embodiments, the microorganism comprises spores. In some embodiments, the microorganism is selected from bacteria, algae, archaea, yeast, mold and fungi.

In some embodiments, an anode as described herein comprises a homogenous population of microorganism. In some embodiments, the microorganism comprises a homogenous population. In some embodiments, an anode as described herein comprises a heterogeneous population of microorganism. In some embodiments, the microorganism comprises a heterogeneous population.

In some embodiments, the microorganism is a genetically modified microorganism. In some embodiments, the genetically modified microorganism is characterized by exoelectrogenic activity. In some embodiments, the genetic modification is a genetic modification that can induce exoelectrogenic activity to the microorganism.

In some embodiments, the microorganism is exoelectrogenic bacteria.

In some embodiments, the bacteria comprise a dry culture bacteria or viable culture bacteria. According to the present invention, any suitable drying technology such as freeze-drying, spray drying, refractive windows drying (described for example, in U.S. Application No. 20070122397) drying under reduced pressure (described for example, in PCT Publication No. WO/2001/036590) may be used so long as the microorganisms are capable of propagating following activation (i.e. remain viable). In some embodiments, dry culture is freeze-dried culture. In some embodiments, the bacteria comprise freeze-dried bacteria. In some embodiments, the bacteria comprise dried bacteria absorbent on nutrients. In some embodiments, the bacteria comprise vegetative or viable bacterial culture.

In some embodiments, the bacteria are exoelectrogenic bacteria selected from *Geobacteraceae, Shewanellaceae, Aeromonadaceae, Alteromonadaceae, Clostridiaceae, Comamonadaceae, Desulfuromonaceae, Enterobacteriaceae, Pasturellaceae*, and *Pseudomonadaceae*. In some embodiments, the bacteria is *Geobacter sulfurreducens*.

In some embodiments, the exoelectrogenic bacteria are genetic modified. In some embodiments, the bacteria is non-exoelectrogenic bacteria, which has been genetic modified. In some embodiments, the genetic modification is a genetic modification that induces exoelectrogenic activity to the bacteria.

As used herein, the terms "exoelectrogenic", "anodophiles" and "anodophilic bacteria" refer to bacteria that transfer electrons to an electrode, either directly or by endogenously produced mediators.

The term "microorganism" as used herein, refers to an organism (e.g. single cell organism) which is only visible using a microscope. The organism of the present invention can be a eukaryotic organism (e.g., protozoa, algae or fungi for example yeast) or a prokaryotic organism (e.g., bacteria or archaea). The microorganisms of the present invention may be in any cellular environment, such as for example, in a biofilm, as isolated cells or as a cell suspension.

In some embodiments, bacteria include Gram-positive bacteria and Gram-negative bacteria. The term "Gram-positive bacteria" as used herein refers to bacteria characterized by having as part of their cell wall structure peptidoglycan as well as polysaccharides and/or teichoic acids and are characterized by their blue-violet color reaction in the Gram-staining procedure. The term "Gram-negative bacteria" as used herein refer to bacteria characterized by the presence of a double membrane surrounding each bacterial cell. The term "fungi" as used herein refers to the heterotrophic organisms characterized by the presence of a chitinous cell wall, and in the majority of species, filamentous growth as multicellular hyphae. The term "yeast" as used herein refers to the eukaryotic micro-organisms classified in the kingdom Fungi. The term "algae" as used herein refers to the simple, typically autotrophic eukaryotic organisms. The term "archaea" as used herein refers to single-celled organisms. These microorganisms lack cell nuclei and are therefore classified as prokaryotes.

In some embodiments, the microorganism of the present invention are dried (e.g. in a powder form) prior to encapsulation thereof.

According to some embodiments, the present invention provides an anode. In some embodiments, the anode comprises: (i) an electrogenic bacteria culture as a dry culture or viable culture, (ii) a conductive material for culture growth and electricity conductivity/electron transport, (iii) inner membrane fabricated from soluble water polymer surrounding the bacteria and the conductive material, and (iv) outer porous membrane being insoluble in water, surrounding the inner membrane.

According to some embodiments, the present invention provides an anode comprising a bacteria, a polymer, nutrients, a conductive material packed by inner water-soluble membrane surrounding by rigid porous outer membrane being insoluble in water. In some embodiments, the bacteria, the polymer and the conductive material are deposited on at least one inner surface of the anode. In some embodiments, the outer porous membrane is rigid.

In some embodiments, the rigid porous membrane is characterized by a width between 100 µm and 1000 µm, 250 µm and 1000 µm, 300 µm and 1000 µm, 500 µm and 1000 µm, 800 µm and 1000 µm, 100 µm and 900 µm, 250 µm and 900 µm, 300 µm and 900 µm, 500 µm and 900 µm, 800 µm and 900 µm, 100 µm and 700 µm, 250 µm and 700 µm, 300 µm and 700 µm, 500 µm and 700 µm, 800 µm and 700 µm, 100 µm and 500 µm, 250 µm and 500 µm, 300 µm and 500 µm, 500 µm and 500 µm, or between 800 µm and 500 µm, including any range therebetween. Each possibility represents a separate embodiment of the present invention.

In some embodiments, the insoluble rigid porous membrane comprises a permeable/dissolved organic matter, inorganic matter. In some embodiments, the permeable membrane can be selected, but not limited from cellulose, cellulose ester, cellulose acetate, ethyl cellulose, nitrocelloluse mixed ester, other cellulose derivates, polycarbonate film, nylon, poly vinylidene fluoride (PVDF, polysulfone, polyethersulfone (PES), etched polycarbonate, polyvinyl-alcohol (PVAL), polyether sulfone (PES) and collagen.

According to some embodiments of the invention, the anode is capable of supporting biofilm formation within. In some embodiments, the use of a rigid porous membrane prevents the invasion of non-desired bacteria into the anode and/or the escaping of the electrogenic biomass from the anode to the host medium.

According to some embodiments, the anode comprises a metal conductor, wherein the metal conductor is positioned across the outer layer, the inner layer and in contact with the conductive material. In some embodiments, the anode comprises at least two of the metal conductor. In some embodiments, the at least two of the metal conductor are positioned parallel to each other. In some embodiments, the anode comprises at least two anodes units. In some embodiments, the metal conductor is positioned across, the at least two anodes. In some embodiments, the metal conductor comprises silver, copper, gold, platinum, or any combination thereof. In some embodiments, the metal conductor comprises a coating. In some embodiments, the metal conductor comprises a coating exterior to the anode. In some embodiments, the coating comprises an insulator polymer. As used herein "insulator polymer" refers to a polymer capable of avoiding electron diffusion in to the medium or other system components. Various insulator polymers are known in the art including thermoset polymers and thermoplastic polymers.

In some embodiments, the anode can encase a polymer to immobilize the metal conductor itself and as well, to provide a sustained surface for bacterial growth and prosperity close to the conductor. In some embodiments, the anode can encase a nutrients core for long term release of growth nutrients and process accelerators. In some embodiments, the anode can encase conductive particles (i.e nanoparticles) that can act as electron carrier from the bacteria culture into the conductor.

According to some embodiments, the anode is characterized by an improved electrogenic activity (see Examples 2-6). In some embodiments, improved is as compared to a control. In some embodiments, an anode as described herein is characterized by an electrogenic activity at least 1-fold, at least 2-fold, at least 5-fold, at least 10-fold, at least 20-fold, at least 50-fold, at least 70-fold, or at least 100-fold or at least 1000-fold higher electrogenic activity, or any value therebetween, when compared to a control. Each possibility represents a separate embodiment of the present invention. In some embodiments, a control refers to an anode devoid of a rigid porous membrane as described herein. As used herein, the term "electrogenic activity" refers to production of electrical activity.

According to some embodiments, the anode is characterized by a life span of at least 1 day, at least 2 day, at least 5 day, at least 10 day, at least 20 day, at least 30 day, at least 35 day, at least 60 day, at least 65 day, at least 90 day, at least 120 day, at least 150 day, at least 250 day, at least 300 day, at least 500 day, at least 600 day, or at least 900 day, including any value therebetween. Each possibility represents a separate embodiment of the present invention.

According to some embodiments, the anode is characterized by a long-term stability in performance (see, e.g., example section, Example 7). According to some embodiments, the anode is characterized by a stability in performance between 1 month and 2 year, between 2 month and 2 year, between 3 month and 2 year, between 4 month and 2 year, between 5 month and 2 year, between 6 month and 2 year, between 7 month and 2 year, between 8 month and 2 year, between 1 month and 1 year, between 2 month and 1 year, between 3 month and 1 year, between 4 month and 1 year, between 5 month and 1 year, between 6 month and 1 year, between 7 month and 1 year, between 8 month and 1 year, between 1 month and 9 month, between 2 month and 9 month, between 6 month and 9 month, between 1 month and 6 month, between 2 month and 6 month, or between 1 month and 3 month, including any range therebetween. Each possibility represents a separate embodiment of the present invention.

The Electrochemical Cell

According to some embodiments, the present invention provides a microbial electrochemical system comprising the anode described herein.

According to some embodiments of the invention, the electrochemical system (electrochemical cell) comprises at least one anode. According to some embodiments of the invention, the electrochemical cell comprises more than 2 anodes. In some embodiments, the electrochemical system comprises at least two anodes. In some embodiments, the anodes are connected in parallel or, in line. In some embodiments, the electrochemical system comprises at least one cathode.

In some embodiments, the microbial electrochemical system comprises a single-chamber or a dual chamber.

In some embodiments, the microbial electrochemical system comprises a cathode. In some embodiments, the cathode comprises a catalyst. In some embodiments, the catalyst forms a layer on at least one surface of the cathode. In some embodiments, the catalyst is a hydrogen reduction catalyst. In some embodiments, the catalyst comprises nickel, iron, platinum, palladium, ruthenium, manganese, molybdenum oxides, carbides, sulfides, and any combination thereof.

In some embodiments, the cathode is positioned opposite to the anode. In some embodiments, the cathode is positioned parallel to anode. In some embodiments, the distance between parallelly positioned cathode and anode is the length of any one of the cathode or anode, at most. In some embodiments the cathode and the anode are attached. In some embodiments the cathode and the anode are in contact. In some embodiments the distance between the cathode and the anode ranges from 0.01 mm to 5 mm, 0.05 mm to 5 mm, 0.1 mm to 5 mm, 0.5 mm to 5 mm, 0.01 mm to 2 mm, 0.05 mm to 2 mm, 0.1 mm to 2 mm, 0.5 mm to 2 mm, 1 mm to 2 mm, 1 mm to 3 mm, 1 mm to 4 mm, 1 mm to 5 mm, 2 mm to 3 mm, 2 mm to 4 mm, 2 mm to 5 mm, 3 mm to 4 mm, 3 mm to 5 mm, or 4 mm to 5 mm or more. Each possibility represents a separate embodiment of the invention.

In some embodiments, the microbial electrochemical system comprises between 2 anode and 10000 anode, between 50 anode and 10000 anode, between 100 anode and 10000 anode, between 500 anode and 10000 anode, between 1000 anode and 10000 anode, between 5000 anode and 10000 anode, disclosed herein, including any range therebetween, wherein the anode are in contact through the metal conductor. Each possibility represents a separate embodiment of the invention. In some embodiments, the anode are in line or in parallel configuration. In some embodiments, the microbial electrochemical system comprises at least 2 anode, at least 50 anode, at least 100 anode, at least 500 anode, at least 1000 anode at least 5000 anode, or at least 10000 anode, disclosed herein, including any value therebetween. Each possibility represents a separate embodiment of the invention.

In some embodiments, the microbial electrochemical system comprises between 2 cathode and 10000 cathode, between 50 cathode and 10000 cathode, between 100 cathode and 10000 cathode, between 500 cathode and 10000 cathode, between 1000 cathode and 10000 cathode, between 5000 cathode and 10000 cathode, including any range therebetween. Each possibility represents a separate embodiment of the invention. In some embodiments, the microbial electrochemical system comprises at least 2 cathode, at least 50 cathode, at least 100 cathode, at least 500 cathode, at least 1000 cathode at least 5000 cathode, or at least 10000 cathode, including any value therebetween. Each possibility represents a separate embodiment of the invention.

In some embodiments, a microbial electrochemical system as disclosed herein comprises a plurality of electrodes. In some embodiments, the herein disclosed system comprises an even number of anodes and cathodes, or an uneven number of anodes and cathodes. In some embodiments, the ratio of anodes to cathodes in the herein disclosed system is 1:1.

In some embodiments, the microbial electrochemical system is a microbial electrolysis cell (MEC). In some embodiments, the microbial electrochemical system is a microbial fuel cell (MFC). In some embodiments, the bacteria act as a catalyst for generation of electrons and protons for production of electricity (in MFC) or hydrogen (in MEC).

In some embodiments, the microbial electrochemical system is for use in wastewater (WW) treatment, waste treatment, land fill, electricity generation, energy generation, hydrogen production, or any combination thereof production. In some embodiments, the microbial electrochemical system is for use as an energy source. In one embodiment, the microbial electrochemical system is for use as an energy source such as for remote sensors and motors.

In some embodiments, the microbial electrochemical system is for use in methane generation. Methane can be formed directly in MECs from the reduction of carbon dioxide combined with electrons and protons under the catalyzed effect of the planktonic anaerobic bacteria in the liquid and the electrochemically active bacteria (EAB) on the electrode surface.

In some embodiments, the microbial electrochemical system comprises an anode enclosed in a permeable mesh comprising: a metal mesh, an organic polymer, an inorganic polymer, or any combination thereof. In some embodiments, the permeable mesh improves biofilm growth. In some embodiments, biofilm growth is improved by inoculating the bacterial cell suspension into the permeable mesh.

In one embodiment, the microbial electrochemical system further comprises a reference electrode. In some embodiments, the microbial electrochemical system comprises an Ag/AgCl electrode.

In some embodiments, the microbial electrochemical system comprises conductive wires connected to the cathode, and to the anode. In some embodiments, the microbial electrochemical system comprises conductive wires connected to the cathode, to the anode and to the reference electrode. In some embodiments, the conductive wires are connected to a potentiostat. In some embodiments, a microbial electrochemical system comprising an anode as described herein, comprising encapsulated bacteria, is characterized by higher activity when compared to a control microbial electrochemical system comprising an anode devoid of encapsulated bacteria. In some embodiments, a microbial electrochemical system comprising an anode as described herein comprising an encapsulated bacteria, is characterized by at least 1-fold, at least 5-fold, at least 10-fold, at least 20-fold, at least 50-fold, at least 70-fold, at least 100-fold, at least 200-fold, at least 500-fold, or at least 1,000-fold higher activity, or any value therebetween, when compared to a control electrochemical cell comprising an anode devoid of encapsulated bacteria. Each possibility represents a separate embodiment of the invention.

In some embodiments, the microbial electrochemical system is characterized by a hydrogen evolution reaction (HER) rate in the range of 0.01 $m^3m^{-3}d^{-1}$ to 5 $m^3m^{-3}d^{-1}$. In some embodiments, a HER rate in the range of 0.015 $m^3m^{-3}d^{-1}$ to 5 $m^3m^{-3}d^{-1}$, 0.020 $m^3m^{-3}d^{-1}$ to 5 $m^3m^{-3}d^{-1}$, 0.05 $m^3m^{-3}d^{-1}$ to 5 $m^3m^{-3}d^{-1}$, 0.1 $m^3m^{-3}d^{-1}$ to 5 $m^3m^{-3}d^{-1}$ comprises 0.2 $m^3m^{-3}d^{-1}$ to 5 $m^3m^{-3}d^{-1}$, 0.4 $m^3m^{-3}d^{-1}$ to 4.5 $m^3m^{-3}d^{-1}$, 0.7 $m^3m^{-3}d^{-1}$ to 3.5 $m^3m^{-3}d^{-1}$, 0.1 $m^3m^{-3}d^{-1}$ to 2.5 $m^3m^{-3}d^{-1}$, 0.15 $m^3m^{-3}d^{-1}$ to 1.1 $m^3m^{-3}d^{-1}$, 0.4 $m^3m^{-3}d^{-1}$ to 1.5 $m^3m^{-3}d^{-1}$, 0.3 $m^3m^{-3}d^{-1}$ to 0.8 $m^3m^{-3}d^{-1}$, 0.1 $m^3m^{-3}d^{-1}$ to 0.75 $m^3m^{-3}d^{-1}$, or 0.35 $m^3m^{-3}d^{-1}$ to 0.95 $m^3m^{-3}d^{-1}$. Each possibility represents a separate embodiment of the invention.

In some embodiments, the microbial electrochemical system is characterized by an improved chemical oxygen demand (COD) removal capacity. In some embodiments, the chemical oxygen demand (COD) removal is enhanced by at least 30%, at least 50%, at least 60%, at least 80%, at least 90%, including any value therebetween. Each possibility represents a separate embodiment of the invention.

In some embodiments, the microbial electrochemical system is characterized by chemical oxygen demand (COD) removal in the range of 30% to 99%, 50% to 99%, 70% to 99%, 75% to 90%, 80% to 90%, 85% to 90%, 70% to 85%, or 75% to 85%, including any range therebetween. Each possibility represents a separate embodiment of the invention.

In some embodiments, the microbial electrochemical is characterized by enhanced current density when compared to a control. In some embodiments, the microbial electrochemical is characterized by at least 1-fold, at least 5-fold, at least 10-fold, at least 20-fold, at least 50-fold, at least 70-fold, at least 100-fold, at least 200-fold, at least 500-fold, or at least 1,000-fold higher current density, or any value therebetween, when compared to a control electrochemical cell as described herein.

Method of Use

According to some embodiments, the present invention provides a method comprising: (i) providing the microbial electrochemical system described hereinabove; (ii) contacting the microbial electrochemical system with a carbon source; and (iii) providing an electrical current to the microbial electrochemical system.

In some embodiments, the present method is for treating wastewater, water, waste, landfill, generating electricity, hydrogen production, or any combination thereof.

In some embodiments, the method further comprises a step comprising contacting the anode with an aqueous solution, thereby activating the anode. In some embodiments, the method further comprises a step preceding step (ii), comprising contacting the anode with an aqueous solution, thereby activating the anode. In some embodiments, activating the anode comprises activating the microorganism.

In some embodiments, the anode may be pre-activated prior to use so as to transform the microorganisms comprised therein from a non-proliferating state to a proliferating state. In some embodiments, activating the population of microorganisms within the anode comprises contacting the anode with a liquid under conditions that allow the liquid to penetrate the outer porous membrane and wet the dried microorganisms inside the inner membrane. In some embodiments, contacting the anode with a liquid (aqueous solution) dissolves the inner membrane (inner layer as described hereinabove).

In some embodiments, the step comprises contacting the anode with the aqueous solution for a period of time ranging from 10 minutes to 100 hour, 30 minutes to 100 hour, 60 minutes to 100 hour, 10 minutes to 90 hour, 30 minutes to 90 hour, 60 minutes to 90 hour, 10 minutes to 24 hour, 30 minutes to 24 hour, or from 60 minutes to 24 hour, including any range therebetween. Each possibility represents a separate embodiment of the invention.

According to the present invention, to activate the microorganism a liquid which comprises any aqueous material, as for example, water, saline or medium (e.g. cell growth medium) which is non-toxic to the microorganisms within may be used. It will be appreciated that a mixture of saline or water or buffer with wastewater may be used, or alternatively the anode may be gradually exposed to wastewater during activation thereof (e.g. by increasing the concentration of the wastewater within the saline). Following activation of the microorganisms, the anode may be relocated to a location of interest according to their intended use (e.g. wastewater). It will be appreciated that the anode of the present invention may also be used without pre-activation. Alternatively, the anode can be activated by contacting the anode with only wastewater.

In some embodiments, the aqueous solution is wastewater. In some embodiments, the liquid is wastewater. In some embodiments, activating the anode is by contacting the anode with wastewater. In some embodiments, the step comprising contacting the anode with an aqueous solution, thereby activating the anode, is performed in wastewater.

In some embodiments, the step comprising contacting the anode with an aqueous solution, thereby activating the anode and step (ii) contacting the microbial electrochemical system with a carbon source, are performed simultaneously.

In some embodiments, the aqueous solution comprises a carbon source. In some embodiments, the carbon source is an aqueous solution. In some embodiments, the aqueous solution and the carbon source is wastewater.

In some embodiments, the anode is substantially devoid of the inner layer. In some embodiments, the inner layer is at least partially dissolved inside the outer layer. In some embodiments, between 1% and 100%, between 5% and 100%, between 10% and 100%, between 50% and 100%, between 70% and 100%, between 90% and 100%, 5% and 99%, between 10% and 99%, between 50% and 99%, between 70% and 99%, between 90% and 99%, 5% and 80%, between 10% and 80%, between 50% and 80%, or between 70% and 80% of the inner layer is dissolved inside the outer layer.

As used herein, unless otherwise stated, adjectives such as "substantially" modifying a condition or relationship characteristic of a feature or features of an embodiment of the invention, is understood to mean that the condition or characteristic is defined to within tolerances that are acceptable for operation of the embodiment for an application for which it is intended.

As used herein, "contacting" is by positioning the anode of the invention in the carbon source and/or liquid (e.g. aqueous solution). In some embodiments, the anode is positioned, placed, incubated, or any equivalent thereof, in the carbon source and/or liquid. In some embodiments, contacting is flowing or moving the carbon source over the anode of the invention. In some embodiments, flowing or moving is continuously flowing or moving or periodically flowing or moving. In some embodiments, the carbon source is stationary.

As used herein, the term "carbon source" encompasses any substrate comprising molecules which can be utilized by an organism, such as a microorganism, as a source of carbon for biomass production and respiratory. In some embodiments, the carbon source comprises an organic compound, an inorganic compound, or any combination thereof. Types of a carbon source which can be utilized by microorganisms are common and would be apparent to one of ordinary skill in the art.

In some embodiments, the carbon source is a liquid carbon source.

In some embodiments, liquid carbon source comprises wastewater (i.e sanitary, industrial, agriculture and landfill), potable water, acetic acid, acetate, citric acid, citrate, or any combination thereof.

In some embodiments, the method is characterized by a COD of more than 600 mg/L, more than 700 mg/L, more than 900 mg/L, more than 1000 mg/L, more than 1500 mg/L, more than 2000 mg/L, more than 500 mg/L, or more than 10000 mg/L, including any value therebetween. Each possibility represents a separate embodiment of the invention.

In some embodiments, the electrochemical cell is characterized by hydrogen evolution reaction (HER) rate in the range of 0.01 $m^3m^{-3}d^{-1}$ to 5 $m^3m^{-3}d^{-1}$. In some embodiments, the electrochemical cell is characterized by HER rate in the range of 0.015 $m^3m^{-3}d^{-1}$ to 5 $m^3m^{-3}d^{-1}$, 0.020 $m^3m^{-3}d^{-1}$ to 5 $m^3m^{-3}d^{-1}$, 0.05 $m^3m^{-3}d^{-1}$ to 5 $m^3m^{-3}d^{-1}$, 0.1 $m^3m^{-3}d^{-1}$ to 5 $m^3m^{-3}d^{-1}$ comprises 0.2 $m^3m^{-3}d^{-1}$ to 5 $m^3m^{-3}d^{-1}$, 0.4 $m^3m^{-3}d^{-1}$ to 4.5 $m^3m^{-3}d^{-1}$, 0.7 $m^3m^{-3}d^{-1}$ to 3.5 $m^3m^{-3}d^{-1}$, 0.1 $m^3m^{-3}d^{-1}$ to 2.5 $m^3m^{-3}d^{-1}$, 0.15 $m^3m^{-3}d^{-1}$ to 1.1 $m^3m^{-3}d^{-1}$, 0.4 $m^3m^{-3}d^{-1}$ to 1.5 $m^3m^{-3}d^{-1}$, 0.3 $m^3m^{-3}d^{-1}$ to 0.8 $m^3m^{-3}d^{-1}$, 0.1 $m^3m^{-3}d^{-1}$ to 0.75 $m^3m^{-3}d^{-1}$, or 0.35 $m^3m^{-3}d^{-1}$ to 0.95 $m^3m^{-3}d^{-1}$, including any range therebetween. Each possibility represents a separate embodiment of the invention.

In some embodiments, the electrochemical cell is characterized by chemical oxygen demand (COD) removal of 70% to 99%, 70% to 95%, 70% to 90%, 75% to 85%, or 70% to 80%, including any range therebetween. Each possibility represents a separate embodiment of the invention.

In some embodiments, the method comprises providing the microbial electrochemical system with a current density ranging from $-17$ $A \cdot m^{-2}$ to 55 $A \cdot m^{-2}$.

As used herein, the term "current density" comprises electrical current.

According to some embodiments, the present invention provides a method of purifying water, the method comprising contacting the microbial electrochemical system described hereinabove with water under conditions that allow the microorganism to decontaminate the water, thereby purifying the water. In some embodiments, the water is wastewater. In some embodiments, the wastewater is selected from the group consisting of petroleum wastewater, food and beverage wastewater, agriculture wastewater, other industrial wastewater and municipal wastewater. In some embodiments, the water is portable water. In some embodiments, the water is effluents after other treating methods.

According to some embodiments, the present invention provides a method for generating an anode described herein, the method comprising: (a) providing a conductive material for electron transfer; (b) covering the conductive material with an inner water-soluble membrane; and (c) covering the inner membrane with a porous membrane being insoluble in water, thereby producing the anode described herein. In some embodiments, the method further comprises contacting the anode with a carbon source; and optionally providing an electrical current to the microbial electrochemical system.

In some embodiments, step (a) further comprises providing (ii) a polymer for bacterial growth. In some embodiments, step (a) further comprises providing (iii) a microorganism, as a dry culture or viable culture. In some embodiments, step (a) further comprises providing (ii) a polymer for bacterial growth, and (iii) a microorganism, as a dry culture or viable culture. In some embodiments, the microorganism comprises a microbial exoelectrogenic culture.

In some embodiments, the microorganism is place in the anode prior the anode is constructed. In some embodiments, the microorganism is injected into the anode. In some embodiments, the microorganism is injected into the anode through the outer membrane, and inner membrane. In some embodiments, the microorganism is injected as so to be in contact with the conductive material. In some embodiments, the microorganism is place in the anode before the anode is fully constructed.

According to some embodiments, the present invention provides a method for generating an anode described herein, the method comprising: (a) providing (i) a microbial exoelectrogenic culture, as a dry culture, endospores culture or viable culture, (ii) a polymer for bacterial growth, and (iii) a conductive material for electron transfer; (b) covering (i), (ii), and (iii) by an inner water soluble membrane; and (c) covering the inner membrane (b) by a porous membrane being insoluble in water, thereby producing the anode described herein. In some embodiments, the method further comprises contacting the anode with a carbon source; and optionally providing an electrical current to the microbial electrochemical system.

In some embodiments, covering the inner membrane by a porous membrane being insoluble in water comprises coating the inner membrane. According to the present invention, coating the inner membrane may be carried out by any method known in the art, as for example, by spraying, dripping, immersing etc. In some embodiments, the inner membrane may be spayed several times (e.g. 3-4 times) as needed to obtain the required thickness.

According to some embodiments, the present invention provides a method of propagating anode generating an energy from wastewater or other forms of waste, the method comprising (i) contacting anode or the microbial electrochemical system with a liquid under conditions that allow the liquid to penetrate the outer membrane and dissolved the inner membrane to wet the dried microorganisms (including spores) so as to generate an activated anode, and (ii) contacting the anode with a medium that is enriched with a carbon source (i.e wastewater) providing an electrical current to the microbial electrochemical system.

General

As used herein the term "about" or "approximate" refers to ±10%.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Materials and Methods

Treatment of Carbon Textile Using Cold Low-Pressure Nitrogen Plasma

The carbon-textile anode material was treated with cold low-pressure nitrogen plasma, using a plasma cleaner system (Harrick PDC-32G-2, USA, RF of 60 Hz, power of 18 W) for 2 minutes at a pressure of 2 torrs. Nitrogen cylinders (>99.00%) were purchased from Oxygen and Argon Works Ltd., Israel. The treated anodes were rinsed in demineralized water to preserve the hydrophilic nature of their surface.

Anode Preparation

The carbon-textile anode material was inserted into the inner membrane (gelatin capsule sizes of 000). Cellulose acetate microfiltration membrane was constructed on the surface of the inner membrane. The width of the constructed outer membrane was 400 µm-600 µm. Once the outer membrane was stabilized, a conductor was inserted into the particle and immobilized with a sealed polymer made of cellulose acetate. Once the conductor was fixed to the outer membrane, he was coated with electrical isolation polymer for the avoidance of electron leakage.

Anode Activation

The particle/anode activation stage was conducted inside anaerobic biological hood. A bacterial culture ($G.$ $sulfurreducens$) was prepared in advanced ($O.D_{600nm}$ 1). The bacterial culture was injected into the anode and the injected hole was sealed by using a polymer made of cellulose acetate. The activated anode was inserted inside a glass bottles with a growth medium (Carbon source, acetate).

$G.$ $sulfurreducens$ Inoculum $G.$ $sulfurreducens$ (DSMZ 12127) was grown in Geobacter medium (N' 826, DSMZ Germany) in 12 borosilicate glass serum bottles in an 80% $N_2$: 20% $CO_2$ atmosphere for about 5-6 days until a significant amount of red bacterial aggregates was formed.

Operation of MEC Utilizing the Immobilized and Non-Immobilized Anodes

A single-chamber MEC was constructed using commercially available glass bottles (ISO LAB, Germany) with a total volume of 100 mL and a working volume of 80 mL. The bottles were sealed with a screw cap and GL-45 silicone rubber septa stoppers (SCHOTT AG, Germany) to avoid air exposure. Woven carbon textile (Fiber fabric parex 30-Fuel Cell Store, USA) (1 cm×5 cm) was used for immobilized and non-immobilized anodes. For the cathode, one side of a carbon cloth (1 cm×5 cm) was platinum (Pt-0.5 mg·cm$^{-2}$) coated (Fuel Cell Store, USA). Titanium wires were used as conductive material for both working and counter electrodes. An Ag/AgCl electrode (3.0 M KCl) (+199 mV vs SHE) (ALS Co., Ltd, Japan) was used as a reference electrode. Prior to constructing the MEC, each working electrode (carbon textile) was pretreated by cold low-pressure nitrogen plasma.

Electrochemical Analysis

The MEC was connected to a MultiEmStat3+ potentiostat (Palmsens, Netherlands) in a 3-electrode configuration. Potentiostatic control was maintained by poising the anode to +0.3 V vs. Ag/AgCl (3.0 M KCl). Linear sweep voltammetry (LSV) was performed in the potential range of −0.5 to 0.8 V and scan rate of 5 mV·s$^{-1}$, in order to acquire mechanistic and phenomenological data of the processes occurring in the system. In all the cases potential (V) against Ag/AgCl reference electrode until further mentioned. A differential pulse voltammetry (DPV) was applied in the same potential range for determining the current-voltage (I-V) curve under semi-steady-state stable conditions. Chemical oxygen demand (COD) and pH were determined using APHA standard methodologies. COD was determined using a closed reflux COD digester, (MRC Labs, China), while pH was determined with a pH meter. Electrochemical tests were performed using a MultiEmStat3+ potentiostat (Palmsens). The chemicals and reagents used were of analytical grade, and distilled water was used for medium preparation. ANOVA testing was performed in Microsoft Excel for all the comparisons.

Constructing the Outer Membrane

Construction of the outer membrane was done using procedure previously described in patent application No. WO/2010/122545.

Anode Construction

Gelatin capsule (size 000, Capsuline) the inventors used to host the anode (3 cm*1 cm carbon mesh). The anode material was made of carbon cloth which was plasma pretreated (CCp) (E-TEK W1400 LT, USA) with a size of 3×1 cm (3 cm$^2$). The Gelatin capsule that is having the carbon mesh was coated with water insoluble cellulose acetate membrane having a pore size of 0.2 μm up to 0.8 μm. After membrane stabilization, a platinum conductive was inserted into and across the capsule thought and attached to the carbon mesh. Isolated polymer was used to avoid electron diffusion into the medium or other system components. The anode is ready to use at dry state without a bacterial culture inside.

Anode Activation

For activating SBP anode, the capsule was inserted into double distilled water (100 mL) at 40° C. for 3 days, until most of the gelatin was dissolved. This stage was pre-active stage and it is aimed to prepare the capsule to host the bacterial culture.

Inoculum of G. sulfurreducens

A pure culture of G. sulfurreducens (DSMZ 12127) was grown in Geobacter medium (N' 826, DSMZ Germany), under an 80% $N_2$: 20% $CO_2$ atmosphere, in a 50 mL borosilicate glass serum bottle with a 20 mm butyl septum (Wheaton Glass Co, USA) for about ten days, until red bacterial aggregates settled on the bottom of the bottle. The supernatant was eluted, and a highly concentrated bacterial suspension was agitated for several minutes. The optical density (OD) was measured using a GENESYS 10S UV-Visible spectrophotometer (Thermo Scientific, USA) at 590 nm. Each of the MECs (5 replicates) was inoculated with one mL of G. sulfurreducens 1.0±0.05 OD. In the MECs based on the encapsulated anode using a small bioreactor platform (SBP) designated MEC-SBP, the inoculation was performed directly into the SBP by using a syringe and a needle. The membrane holes from the syringe were sealed with the membrane polymer (5 μl×3 times). While the MECs (5 replicates) which were based on bare anodes (MEC-control), were inoculated into the whole liquid volume (100 mL).

Preparation of Artificial Wastewater

Staphylococcus aureus (ATCC 25923, USA), Escherichia coli (6899 DSMZ, Germany), Enterobacter cloacae (30054 DSMZ, Germany) and Pseudomonas putida (6125 DSMZ, Germany) were grown to the log phase in 15 mL Lauria broth (LB) (Himedia, M575, India) in 50 mL tubes for about 5 hours. Each culture was diluted to 0.8±0.05 OD.

The artificial wastewater included, 1 mL of each strain in LB (total of 4 mL), 10 mL yeast extract (7184A, Neogen, USA), 69 mL Geobacter medium and 17 mL phosphate buffer (PB) pH 6.8.

Cathode Materials

The cathodes were comprised of carbon cloth (CC) coated with 0.5 mg cm$^{-2}$ Pt/60% on carbon support (CTM-GDE-02, FuelCellsEtc, USA), with a geometric area of 6.25 cm$^2$ (2.5×2.5 cm).

MEC Setup

A single-chamber MEC (100 mL glass bottle) equipped with a double-layer silicone/PTFE septum cap was filled with 80 mL Geobacter medium (N' 826, DSMZ Germany) and a final concentration of 100 mM phosphate buffer, pH 6.8 (20 mL). For chronoamperometry study, the MEC was connected to a MultiEmStat3+ potentiostat (Palmsens-Netherlands) in a three-electrode configuration: Pt catalyzed cathode, Ag/AgCl 3M KCl reference electrode (RE-1CP, ALS, Japan) and SBP or control anode and operated under a constant potential of 0.3 V vs. Ag/AgCl (3 M KCl). The distance between the anode and cathode was about 1 cm. In the MECs using the SBP anode, 1 mL (1.0±0.05 OD) of G. sulfurreducens was injected into the SBP-anode upper side, making a small pinhole in its top. The pinhole was sealed with two layers of cellulose acetate polymer. The control MECs were inoculated via injection into the main MEC volume (100 mL). The MECs were fed with acetate or wastewater with a COD of 1200±50 mg $L^{-1}$.

Five replicates of MEC-SBP and MEC-control were placed in a thermostatic bath at 37° C. The MECs were connected to a MultiEmStat3+ potentiostat (Palmsens-Netherlands) in a three-electrode configuration and operated under a constant potential of 0.3 V vs. Ag/AgCl (3 M KCl) for 90 days.

Electrochemical Measurement and Chemical Analyses

In the anode electrochemical study experiments, the MECs were connected to a multi-channel potentiostat (Ivium N-Stat, Netherlands) in a 3-electrode configuration. Linear sweep voltammetry (LSV) was performed in the potential range of −0.5 to 0.8 V vs. Ag/AgCl (3 M KCl) at a scan rate of 5 mV s$^{-1}$ to allow a steady-state polarization.

For cathode electrochemical study, the MEC was connected to a MultiEmStat3+ potentiostat (PalmsensNetherlands) in a two-electrode configuration: Pt catalyzed cathode, and SBP or control anode Linear sweep voltammetry (LSV) was performed in the potential range of −0.5 to 0.8 V vs. Ag/AgCl (3 M KCl) at a scan rate of 5 mV s$^{-1}$ to allow a steady-state polarization.

Hydrogen production rate measurements were carried out in a two electrodes configuration using the bacterial anode and the Pt cathode at predefined cell's constant voltages.

The calculation of hydrogen evolution rates (HER) under applied constant potentials was performed according to Equations 1-3 and hydrogen yield according to Equations 4-5. These equations are similar to the presented equations by Logan (Logan, 2008, chapter 8).

$$V_{H_2} = \frac{I \times t \times R \times T}{z \times F \times P}, \quad (1)$$

where $V_{H_2}$—Hydrogen production volume (m$^3$s$^{-1}$), P—gas pressure (atm), V—gas volume (m$^3$), z—valence of an element, R—the gas constant (0.0820577 L atm (mol$^{-1}$ K$^{-1}$), T—gas temperature (K), I—current (A), t—time (s), and F—Faraday's constant (96,485 C mol$^{-1}$).

$$Q(V_r)_{H_2} = V_{H_2}(m^3) \times t(d^{-1}) \times V_r(m^{-3}), \quad (2)$$

where $Q(V_r)_{H_2}$—HER production rate per cubic meter of the MEC medium, $V_{H_2}$—Hydrogen production volume (m$^3$s$^{-1}$, calculated from Equation 1), t—time in seconds normalized to 24 h, and $V_r$—reactor volume normalized to cubic meters (m$^3$).

$$Y_{H_2} = \frac{n_{H_2} \times M_{H_2}}{V_L \times \Delta COD}, \quad (4)$$

where $Y_{H_2}$ is hydrogen yield in the MEC, $n_{H_2}$—moles of hydrogen, $M_{H_2}$—hydrogen molecular weight, $V_L$—volume of the liquid in the single-chamber MEC and ΔCOD is the change in COD based on the starting and final concentrations in a selected period.

$$n_{H_2} = \frac{I \times t}{2 \times F}, \quad (5)$$

where $n_{H_2}$—the moles of hydrogen that can recovered based on the measured current, I—current, t—time in seconds normalized to 24 h, 2—moles of electrons per mole of hydrogen, F—Faraday's constant.

Chemical oxygen demand (COD) was examined as per APHA standard methods (APHA, 1998). The COD was determined using a colorimetric-based closed reflux COD digester (MRC Labs, China).

Biofilm Viability on the Bacterial Anodes

Examination of the biofilm viability on the anodes was performed at the end of the MECs' operation. MTT (3-(4, 5-Dimethylthiazol-2-yl)-2,5-diphenyltetrazolium bromide) analysis is based on the bacterial hydrogenase activity, which reduced the tetrazolium regent (3-(4,5-dimethylthiazol-2-yl)-2,5-diphenyltetrazolium bromide, Merck, Germany). In its oxidized form, the tetrazolium solution is yellow, and in its reduced form, it turns blue. The intensity of the blue color can be measured with a spectrophotometer. Each anode (4 cm$^2$) with the attached biofilm was washed three times with PBS to remove the planktonic bacteria. The anode was transferred to 50 mL tubes containing 15 mL of MTT solution and was incubated for 2 h at room temperature in the dark. Then the MTT solution was removed and replaced by 15 mL of dimethyl sulfoxide:EtOH solution (1:1 ratio) for 20 min. The absorbance of the solution was examined using a spectrophotometer at 540 nm.

Relative Microbial Distribution Analysis of Biofilm and Planktonic Community

The relative microbial distribution analysis was conducted on the encapsulated and non-encapsulated anodes by HyLabs Pvt Ltd, Israel. DNA was extracted using the DNeasy Powersoil kit (Qiagen) according to the manufacturer's instructions. A 16s library preparation for sequencing on Illumina was performed using a 2-step PCR protocol. In the first PCR, the v4 region of the 16s rRNA gene was amplified using the 16s 515F and 806R from the Earth Microbiome Project with CS1 and CS2 tails. The second PCR was done using the Fluidigm Access Array primers for Illumina, to add the adaptor and index sequences. Sequencing was done on the Illumina Miseq, using a v2-500 cycles kit to generate 2×250 paired-end readings. Demultiplexing was performed on Basespace (the Illumina cloud) to generate FASTQ files for each sample. The data was furthered analyzed using CLC-bio to generate OTU and Abundance tables.

Statistics

Data are expressed as means±STDEV function (standard deviation) of between 4 and 6 replicates. The results were statistically analyzed using a one-way analysis of variance (ANOVA). Differences between the values were considered significant at P-value <0.05.

Example 1

Prototypes 1A and 1B Construction and Tests

Figure 1B:
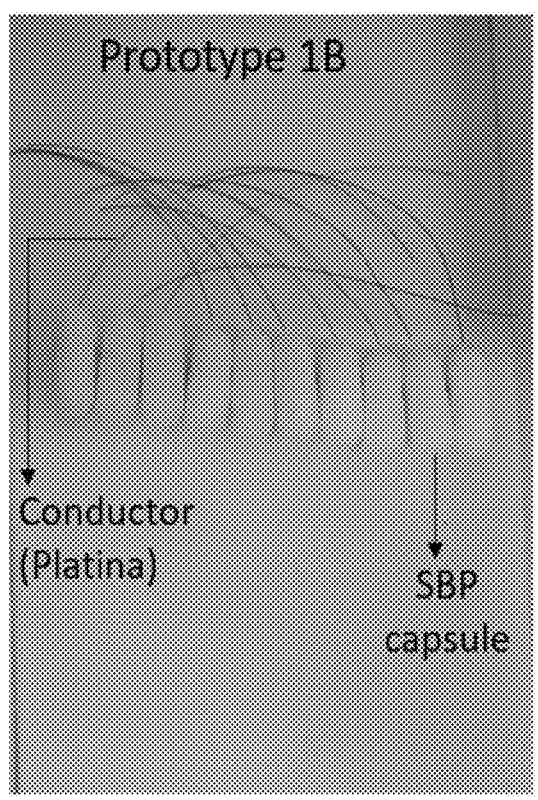
Figure 1C:
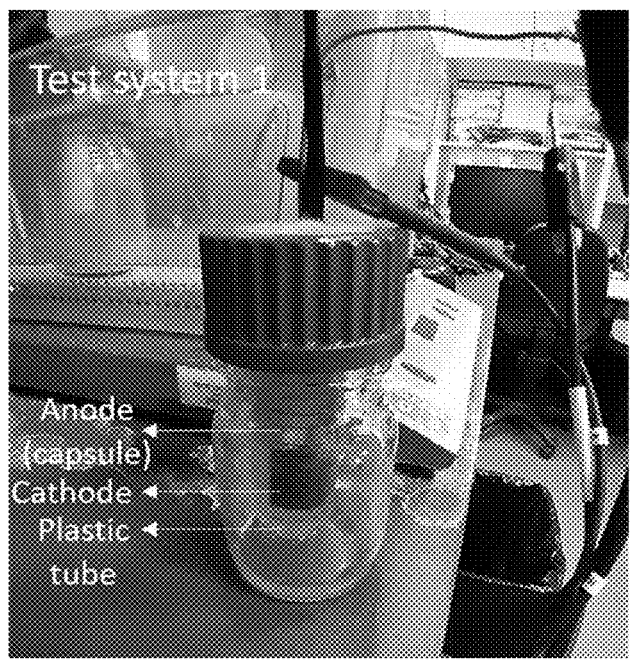
Figure 1D:
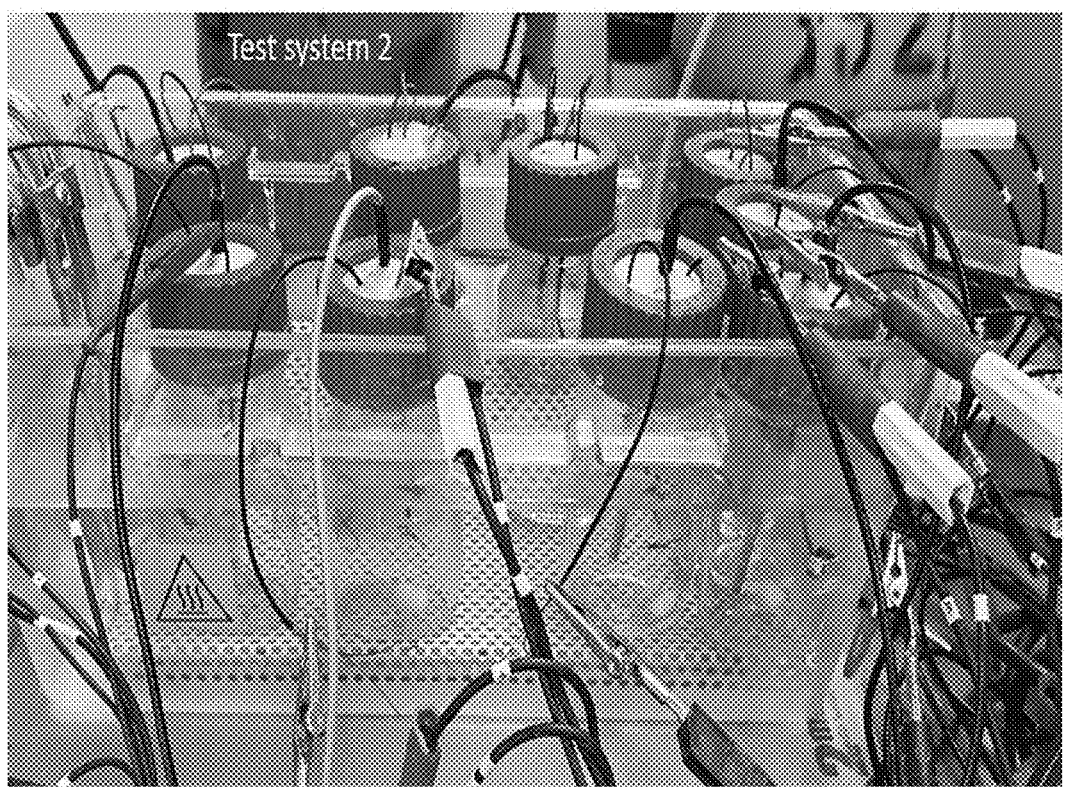

Prototype 1A (FIG. 1A) and 1B (FIG. 1B) were built as follows: Woven carbon textile (Fiber fabric parex 30-Fuel Cell Store, USA) (1 cm×5 cm), was inserted at the bottom of the inner membrane. Cellulose acetate was used to build the structural membrane upon the inner membrane. The membrane was rigid, and its width was approximate 500 μm. Once the outer membrane was stabilized, the inventors had pierced the membrane and inserted into the capsule thought the Woven carbon textile a metal conductor. Prototype 1A has a steal conductor (syringe needle), while prototype 1B has a platinum conductor. The conductor was adhering to the membrane by using a sealing polymer made by cellulose acetate. At the experiment day, the inventors used a syringe and a needle to transfer the suspended bacteria culture into the capsule. The penetration site of the capsule was vertical. After injecting approximate 1.2 mL of suspended *G. sulfurreducens*. Sealing the membrane injecting hole was done by using a sealing polymer made by cellulose acetate. The conductors were coated with a plastic sleeve. The anode was inserted into a plastic tube (50 mL) with a medium encasing acetate as a carbon source. In test system 1 (FIG. 1C) plastic tube was placed into a glass bottle with a membrane, so the upper area of the conductor was positioned outside the glass bottle. In test system 2 the anode (capsule) was inserted directly into the glass bottle (FIG. 1D). All procedures were conducted an anaerobic hood (CO$_2$ flow). A second sealing layer was constructed with glycerol. The systems were incubated in a water bath at 37° C. After few days of tests, the measured current was as follows (3 systems): system 1. 62 μA, system 2. 25 μA and system 3. 26 μA.

Example 2

Prototype 2 Construction and Tests

Figures 2A, 2B, 2C:
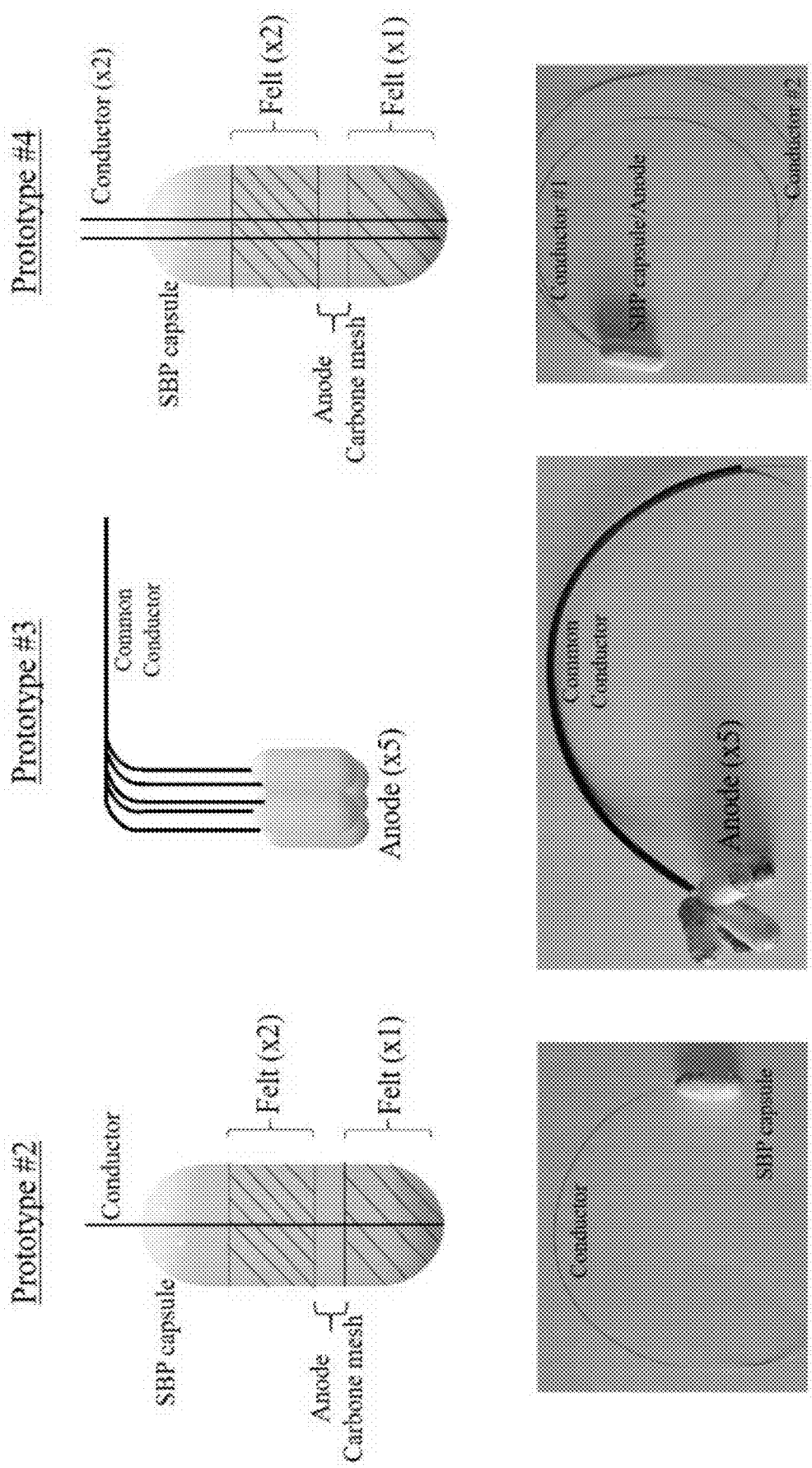
FIGS. 2A-C present schematic representation and pictures of anode prototype 2 (FIG. 2A), prototype 3 (FIG. 2B) and prototype 4 (FIG. 2C)

Prototype number 2 (FIG. 2A) was constructed as follows: into the inner membrane (gelatin capsule) at the bottom, the inventors immobilized 1 cm×3 cm felt. Above the felt the inventors positioned a Woven carbon textile (Fiber fabric parex 30-Fuel Cell Store, USA) (1 cm×1 cm), and above it a second felt (1 cm×1 cm). Cellulose acetate was used to build the outer membrane upon the inner membrane. The membrane was rigid, and its width was approximate 300 μm. Once the outer membrane was stabilized, the inventors had pierced the membrane and inserted into the capsule, thought the Woven carbon textile, a metal conductor made of platinum. The conductor was adhering to the membrane by using a sealing polymer made of cellulose acetate. At the experiment day, the inventors used a syringe and a needle to transfer the suspended bacteria culture into the capsule. The penetration site of the capsule was vertical. After injecting approximate 0.2 ml of suspended *G. sulfurreducens*, sealing the membrane injecting hole was done by using a sealing polymer made by cellulose acetate. The conductors were coated with a plastic sleeve. FIG. 2A presents the illustration and the picture of prototype 2 and FIG. 3 the produced currents results. The control for this test was a non-capsule electrochemical system that is having *G. sulfurreducens*. The trail was conducted for a period of 26 days. After 26 days, the produced current was stabilized on approximate 2.4 μA, 0 μA and 32 μA (FIG. 3, large dashed curve), one of those systems encasing the prototype number 2 produced at the 26 day up to 32 μA. The control (×3) systems at the 26 day of the study produced 3.4 μA, 0 μA and 11.5 μA (Table 1 and FIG. 3, small dashed curve).

TABLE 1

| | Current (μA) | | |
|---|---|---|---|
| Time (days) | Control ch1 | Control ch2 | Control ch3 |
| 1 | 0.084 | 0.4088 | 0.0703 |
| 2 | 1.864 | 0.3667 | 0.6132 |
| 6 | 1.6 | 0.478 | 0.695 |
| 7 | 1.52 | 0.591 | 0.902 |
| 8 | 1 | 0.178 | 1.165 |
| 9 | 1.2 | 0.0744 | 0.715 |
| 10 | 0.37 | 0.575 | 1.229 |
| 11 | 0.149 | 1.017 | 1.0264 |
| 15 | 0.767 | 0.371 | 4.856 |
| 16 | 0.698 | 0.927 | 3.742 |
| 19 | 0.7 | 1.2 | 1 |
| 20 | 0.9 | 1.433 | 3.806 |
| 21 | 1 | 1.3 | 4.1 |
| 22 | 0.707 | 0.235 | 3.75 |
| 26 | 3.4 | 0.0009 | 11.5 |

Based on those results, and without being bound to any particular theory, the inventors can conclude that prototype number 2 presents a superior electrogenic activity in comparison to the control system anode by at least 2.78 folds.

Example 3

Prototype 3 Construction and Tests

Prototype number 3 was constructed as follows: into the inner membrane (gelatin capsule) at the bottom, the inventors immobilized 1 cm×1 cm felt. Above the felt the inventors positioned a Woven carbon textile (Fiber fabric parex 30-Fuel Cell Store, USA) (1 cm×1 cm), and above him a second felt (1 cm×1 cm). Cellulose acetate was used to build the structural membrane upon the inner membrane. The membrane was rigid, and her width was approximate 300 μm. Once the outer membrane was stabilized, the inventors had pierced the membrane and inserted into the capsule, thought the Woven carbon textile, a metal conductor made of platinum. The conductor was adhering to the membrane by using a sealing polymer made of cellulose acetate. 5 capsules (anode) were merge by connecting all the conductors into one conductor. Therefore, the inventors got one anode structure made of 5 subunits (5 anodes).

At the experiment day, the inventors used a syringe and a needle to transfer the suspended bacteria culture into the capsule. The penetration site of the capsule was vertical. After injecting approximate 0.2 mL of suspended *G. sulfurreducens*. Sealing the membrane injecting hole was done by using a sealing polymer made by cellulose acetate. The conductors were coated with a plastic sleeve.

Figure 3:
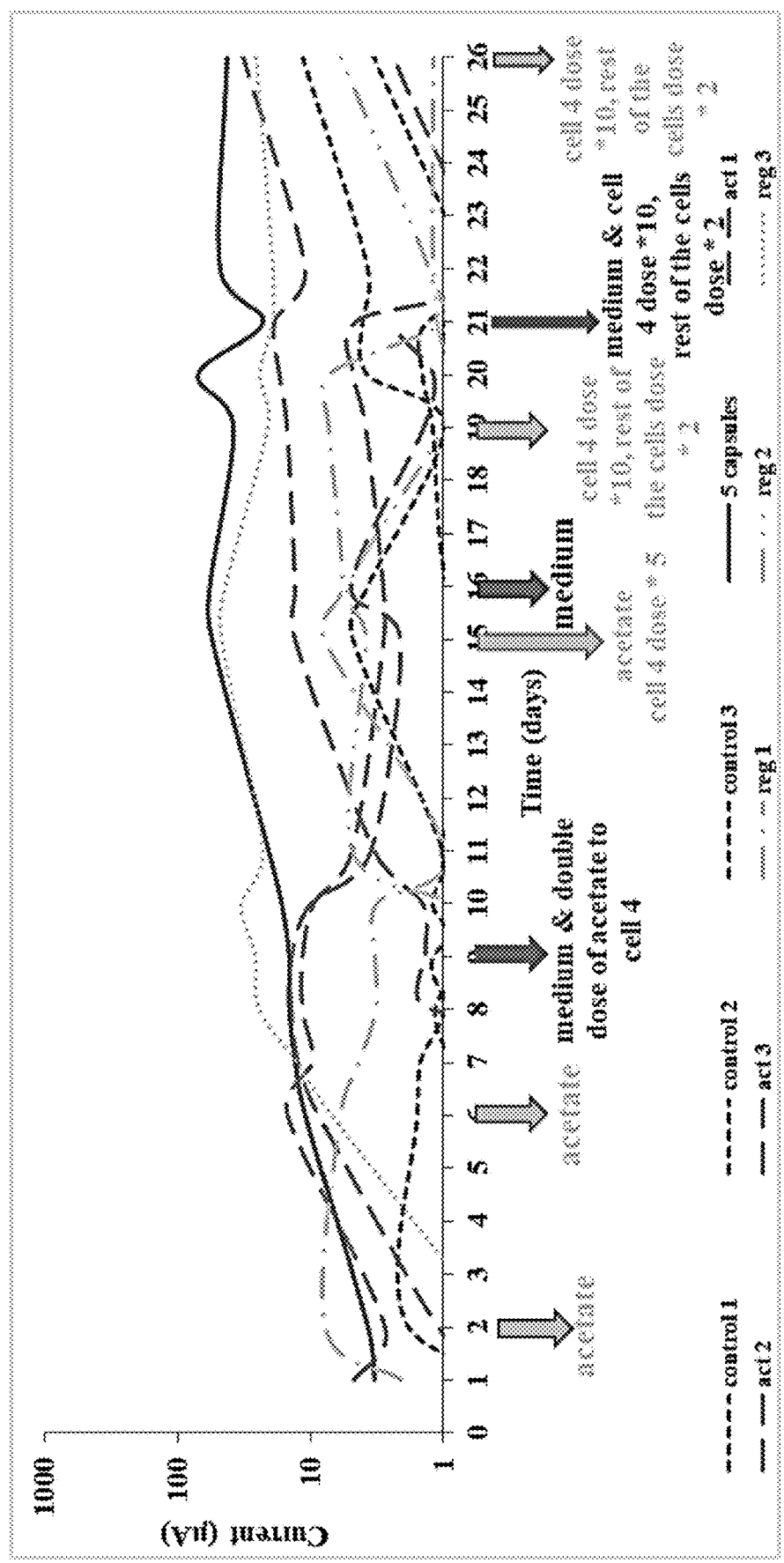
FIG. 3 presents a graph of the produced currents of the anode prototypes compared to control anodes.

FIG. 2B presents the illustration and the picture of prototype 3 and the produced currents results are presented in FIG. 3. The control system for this test was a non-capsule electrochemical system that is having *G. sulfurreducens*. The trail was conducted for a period of 26 days. The control for this test was a non-capsule electrochemical system that is having *G. sulfurreducens*. After 26 days, the produced current was stabilized on approximate 42.4 μA (Max. 57.2 μA) (FIG. 3, line). The control (×3) systems at the 26 day of the study produced 3.4 μA, 0 μA and 11.5 μA (Table 1 and FIG. 3, small dashed curve). Based on those results, and without being bound to any particular theory, the inventors can conclude that prototype number 3 is presenting a superior electrogenic activity in comparison to the control system anode by at least 3.68 folds.

Example 4

Prototype 4 Construction and Tests

Prototype number 4 (FIG. 2C) was constructed as follows: into the inner membrane (gelatin capsule) at the bottom, the inventors immobilized 1 cm×1 cm felt. Above the felt the inventors positioned a Woven carbon textile (Fiber fabric parex 30-Fuel Cell Store, USA) (1 cm×1 cm), and above him a second felt (1 cm×1 cm). Cellulose acetate was used to build the structural membrane upon the inner membrane. The membrane was rigid, and her width was approximate 300 μm. Once the outer membrane was stabilized, the inventors had pierced the membrane and inserted into the capsule, thought the Woven carbon textile, two metal conductors made of platinum. The conductors were adhering to the membrane by using a sealing polymer made of cellulose acetate.

At the experiment day, the inventors used a syringe and a needle to transfer the suspended bacteria culture into the capsule. The penetration site of the capsule was vertical. After injecting approximate 0.2 mL of suspended *G. sulfurreducens*. Sealing the membrane injecting hole was done by using a sealing polymer made by cellulose acetate. The trail was conducted for a period of 26 days. The control for this test was a non-capsule electrochemical system that is having *G. sulfurreducens*. After 26 days, the produced current was stabilized on up to 25.6 μA (1.2 μA, 5.95 μA and 25.6 μA) (FIG. 3, doted curve). The control (×3) systems at the 26 day of the study produced 3.4 μA, 0 μA and 11.5 μA (Table 1 and FIG. 3, small dashed curve). Based on those results, and without being bound to any particular theory, the inventors can conclude that prototype number 4 presents a superior electrogenic activity in comparison to the control system anode by at least 2 folds.

Table 2 presents the summary of the results obtained for prototypes 2, 3 and 4.

TABLE 2

| | Prototype | | | | | | |
|---|---|---|---|---|---|---|---|
| Time (days) | 3 ch4 | 2 ch5 | 2 ch6 | 2 ch7 | 4 ch8 | 4 ch9 | 4 ch10 |
| | Current (µA) | | | | | | |
| 1 | 3.314 | 4.786 | 0.408 | 0.0005 | 2.099 | 0.1268 | 0.2045 |
| 2 | 3.722 | 2.792 | 1.099 | 0.0806 | 7.835 | 0.703 | 0.409 |
| 6 | 10.95 | 14.92 | 8.68 | 0.0007 | 6.03 | 0.4337 | 6.946 |
| 7 | 13 | 9.72 | 12.32 | 0.0008 | 4.366 | 0.4605 | 12.535 |
| 8 | 14.47 | 11.55 | 13.79 | 1.288 | 3.262 | 0.574 | 24.35 |
| 9 | 14.46 | 11.49 | 13.73 | 1.376 | 3.29 | 0.5813 | 26.01 |
| 10 | 16.45 | 9.47 | 9.86 | 1.443 | 3.197 | 0.9284 | 33.07 |
| 11 | 20.65 | 4.912 | 3.512 | 3.34 | 0.972 | 4.892 | 22.81 |
| 15 | 55.2 | 2.853 | 2.115 | 13.1 | 7.95 | 3.853 | 46.7 |
| 16 | 57.2 | 2.882 | 4.947 | 13.03 | 5.84 | 5.225 | 43.56 |
| 19 | 38 | 3.9 | 1.4 | 15 | 7.4 | 1 | 21 |
| 20 | 70 | 4.85 | 1.193 | 17.109 | 7.332 | 0.94 | 24 |
| 21 | 22.7 | 4.6 | 2.3 | 18.6 | 1 | 1.13 | 19.26 |
| 22 | 47.89 | 0.617 | 0.89 | 11 | 1.2 | 1.3 | 19.12 |
| 26 | 42.4 | 2.4 | 0 | 32 | 1.2 | 5.95 | 25.6 |

Example 5

Figure 4:
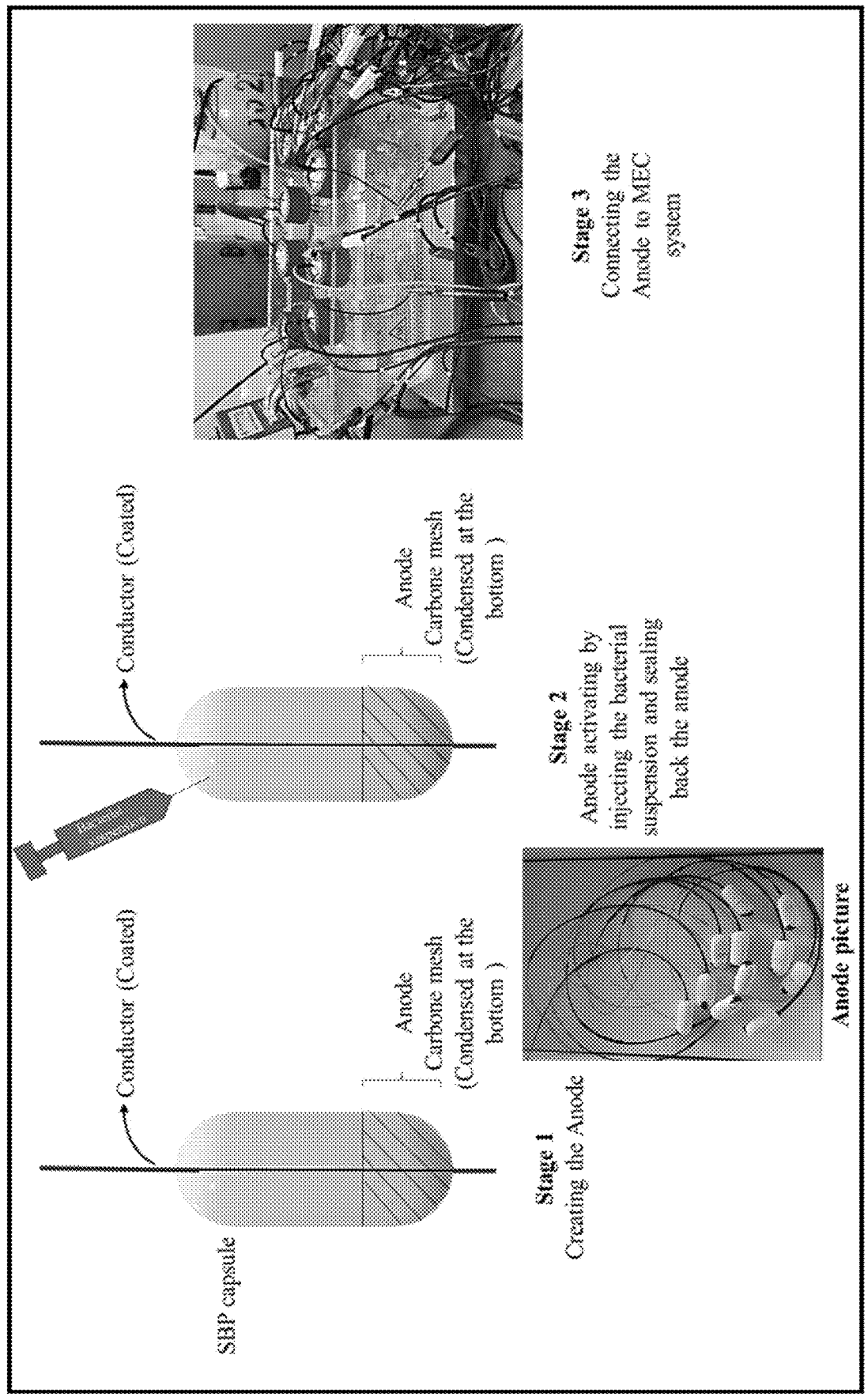
FIG. 4 presents a schematic representation of an anode construction and activation stages.

LSV Measurements of MEC-SBP and MEC-Control Utilizing Acetate as the Sole Carbon Source FIG. 4 presents the steps of anode construction and activation.

A set of single-chamber MECs based on CCp anodes encapsulated in SBP and platinum-coated CC cathodes was constructed and designated MEC-SBP. MECs with the same anode materials but without encapsulation served as controls, defined as MEC-control. The MECs-control were inoculated with 1 mL *G. sulfurreducens* suspended in Geobacter medium into the MEC facility containing 100 mL Geobacter medium. The MECs-SBP were inoculated with the same OD and volume but directly into the SBP-capsule. The whole liquid (Geobacter medium, phosphate buffer and acetate as the sole carbon source) were replaced once a week and twice a week the MECs were fed with only acetate. The MECs were maintained under an external voltage of 0.3 V vs. Ag/AgCl. LSV measurements were performed once a week. The LSV analyses on the $14^{th}$ and $27^{th}$ days of operation are shown in FIGS. 5A-B.

Figure 5A:
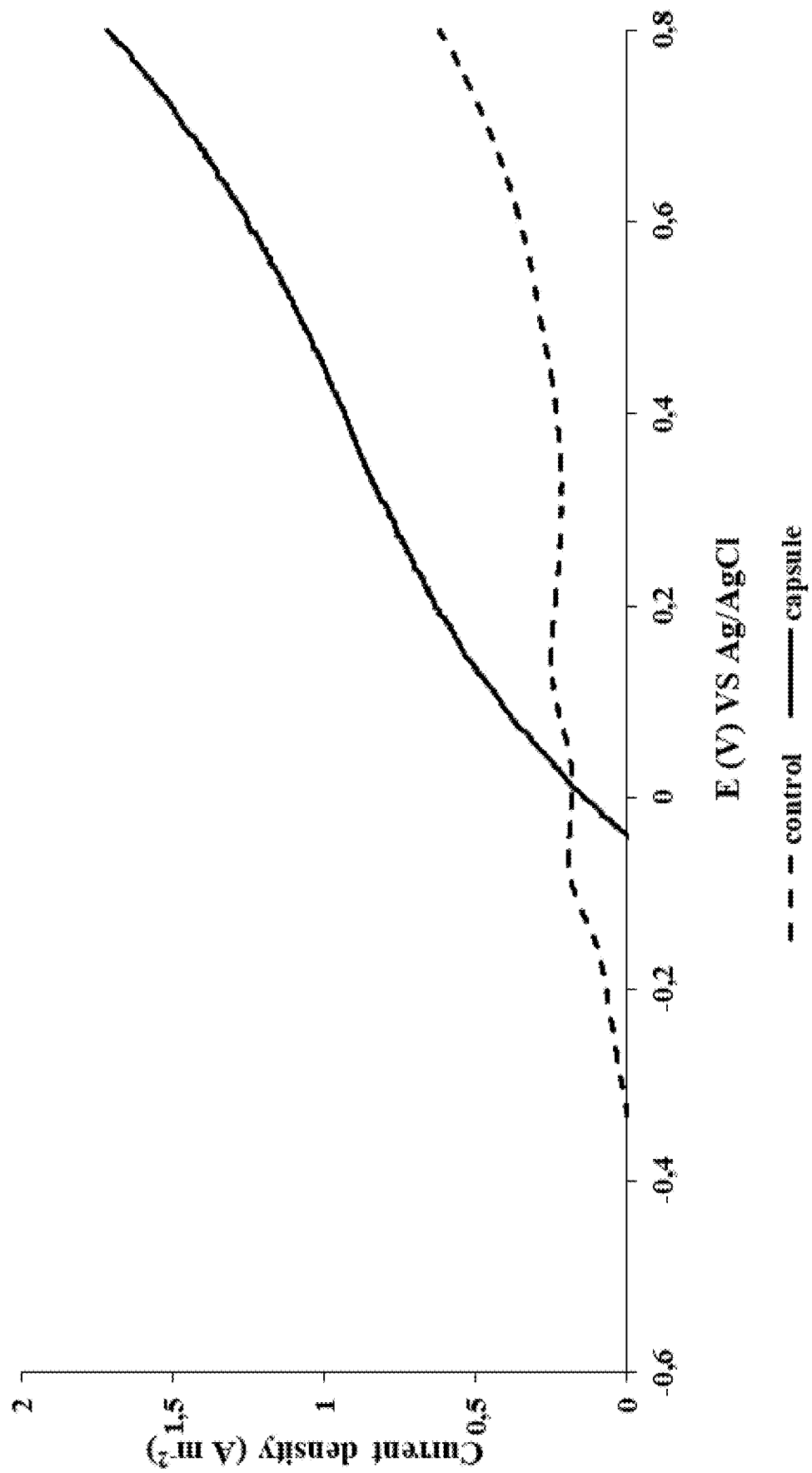
FIGS. 5A-B present graphs of LSV polarization curves of MEC-SBP (black line) and MEC-control (dashed line) which were supplied with Geobacter medium, including acetate as the sole carbon source. On the $14^{th}$ (FIG. 5A) and $27^{th}$ (FIG. 5B) days of the MECs operations. LSV analysis was carried out at a scan rate of 5 mV s$^{-1}$ versus Ag/AgCl.
Figure 5B:
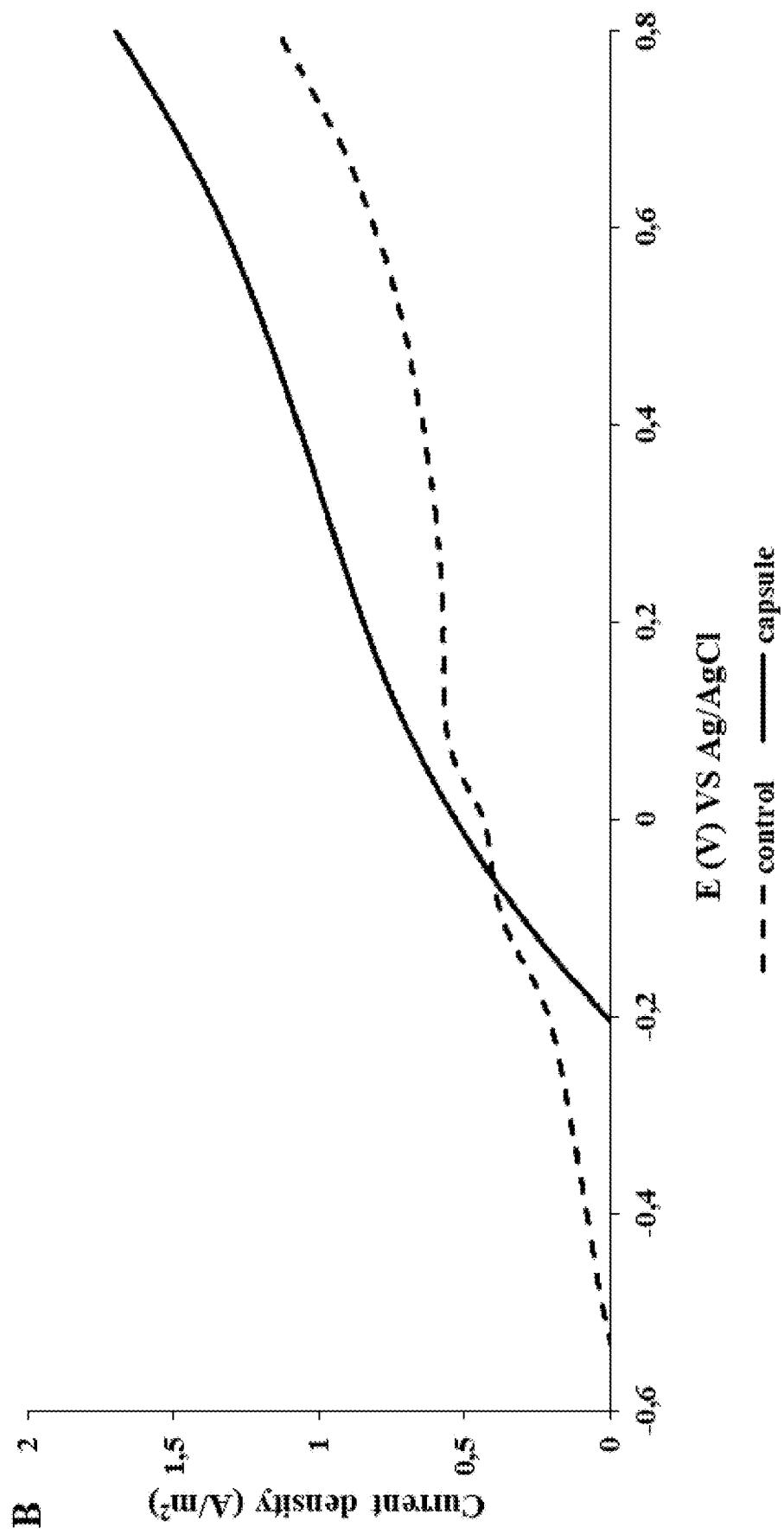

The results depicted in FIGS. 5A and B show that the MEC-SBP based on the encapsulated anode led to higher currents compared to the MEC-control. On the $14^{th}$ and $27^{th}$ days, under an applied voltage of 0.6 V vs. Ag/AgCl, the current of the MEC-SBP was 1.26 and 1.32 A m$^{-2}$, respectively. In comparison, the MEC-control yielded currents of only 0.35 and 0.81 A m$^{-2}$, respectively.

The onset (rise of the oxidation current above the background level) on the $14^{th}$ and $27^{th}$ days of the MEC-SBP was observed at −0.039 and −0.20 V vs. Ag/AgCl, and in MEC-control at −0.33 and −0.53 V, respectively. These results show that the rise of the oxidation currents of the MEC-SBP occurs in lower potentials than of the MEC-control.

To summarize, on the $14^{th}$ and $27^{th}$ days, the MEC-SBP led to currents of 3.6 and 1.63 folds compared to the MEC-control.

Example 6

LSV Measurements of MEC-SBP and MEC-Control Utilizing Artificial Wastewater as the Carbon Source The MECs were fed with acetate as the carbon source for 32 days, followed by artificial wastewater for another 53 days. In this period, the artificial wastewater were replaced once a week, and acetate was added twice a week. LSV measurements were performed at least once a week. Measurements of the 36 and 57 days of the MECs operation are shown in FIGS. 6A-B.

Figure 6A:
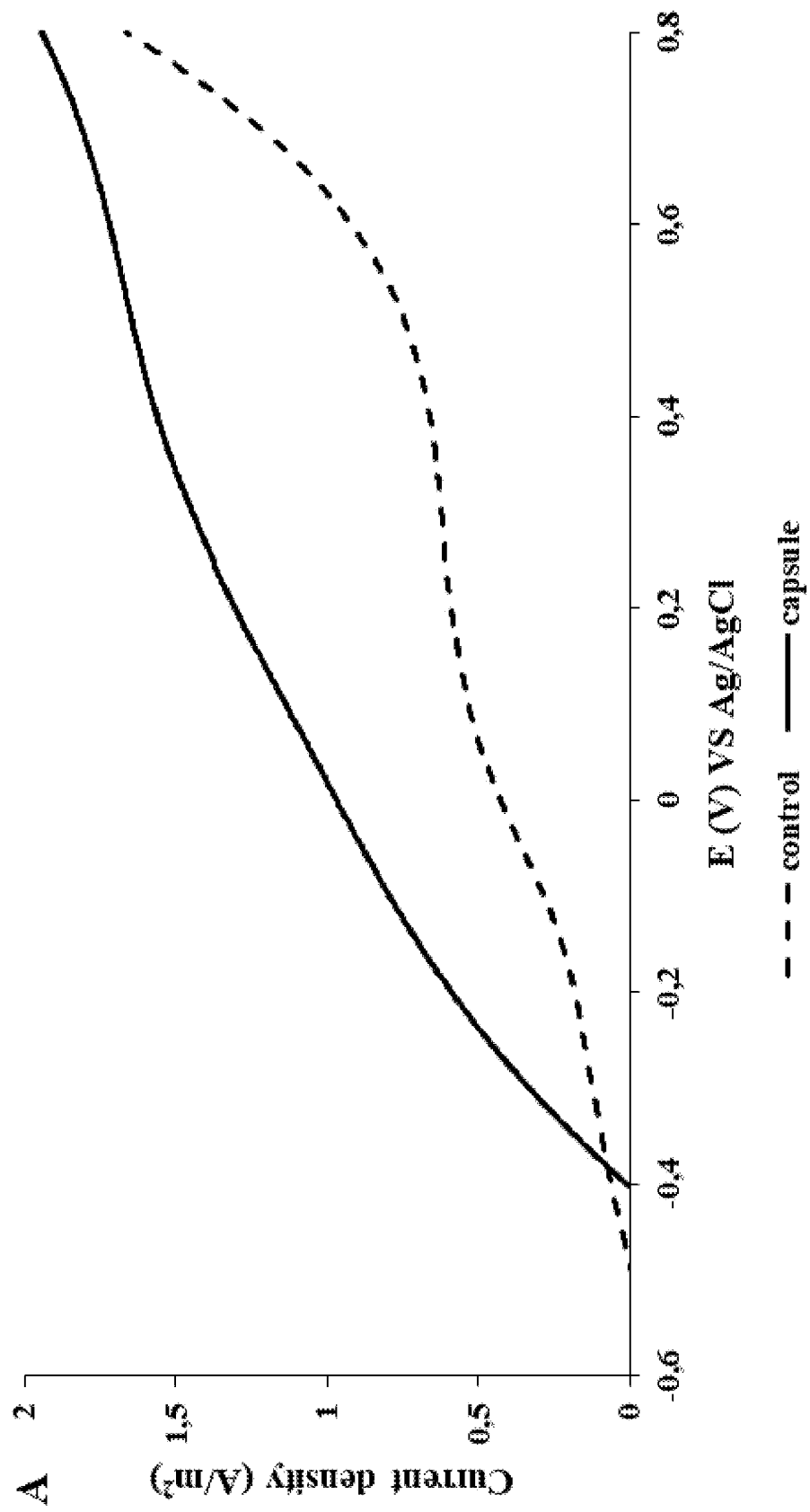
FIGS. 6A-B present graphs of LSV polarization curves of MEC-SBP (black line) and MEC-control (dashed line) which were supplied with artificial wastewater as the carbon source. On the $36^{th}$ (FIG. 6A) and $57^{th}$ (FIG. 6B) days of the MECs operations. LSV analysis was carried out at a scan rate of 5 mV s$^{-1}$ versus Ag/AgCl.
Figure 6B:
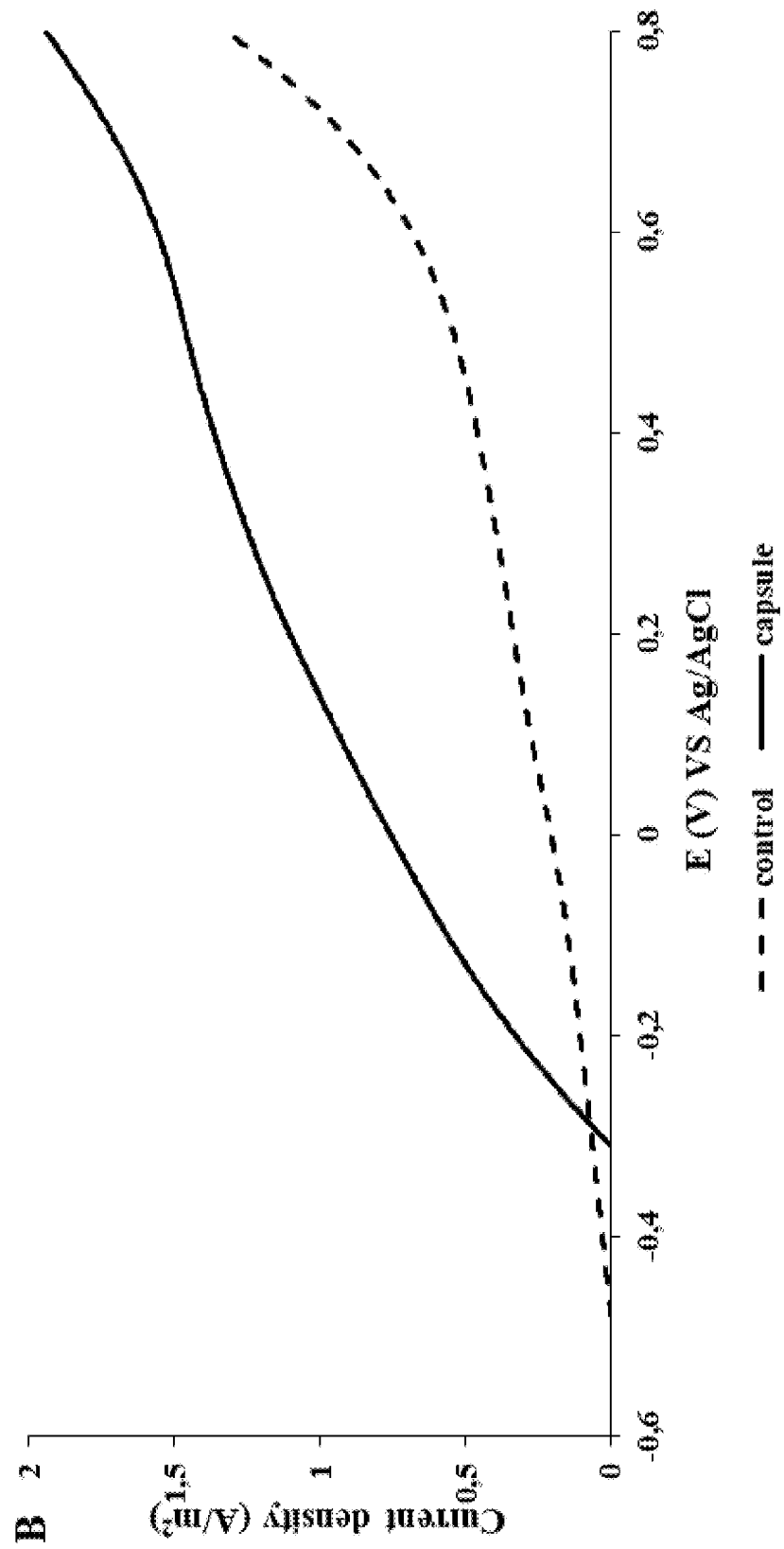

The results depicted in FIGS. 6A-B show that the MEC-SBP based on the encapsulated anode led to higher currents compared to the MEC-control. On the $36^{nd}$ and $57^{th}$ days, under an applied voltage of 0.6 V vs. Ag/AgCl, the currents of the MEC-SBP was 1.72 and 1.56 A m$^{-2}$, respectively. In comparison, the MEC-control yielded currents of only 0.92 and 0.59 A m$^{-2}$, respectively.

The onset of the MEC-SBP on the $36^{nd}$ and $57^{th}$ days were observed at the potentials of −0.40 and 0.03 V vs. Ag/AgCl, respectively, and in the MEC-control at −0.48 and −0.47 V. These results show that the MECs-SBP have better electrochemical performance compared to the MECs-control.

To summarize, on the $36^{nd}$ and $57^{th}$ days, the MEC-SBP led to currents of 1.87 and 2.03 folds compared to MEC-control, respectively.

Example 7

Reduction Currents and Hydrogen Production in MEC-SBP and MEC-Control Utilizing Acetate as the Sole Carbon Source Followed by Artificial Wastewater MEC-SBP and MEC-control were fed with acetate as the sole carbon source for 32 days, followed by 55 days of feeding with artificial wastewater. Reduction currents were performed at least once a week when the MECs were supplied with acetate (FIG. 7A) and artificial wastewater (FIG. 7B). The reduction currents analysis were conducted when the MECs were in a configuration of a complete cell (two-electrode configuration).

Figure 7A:
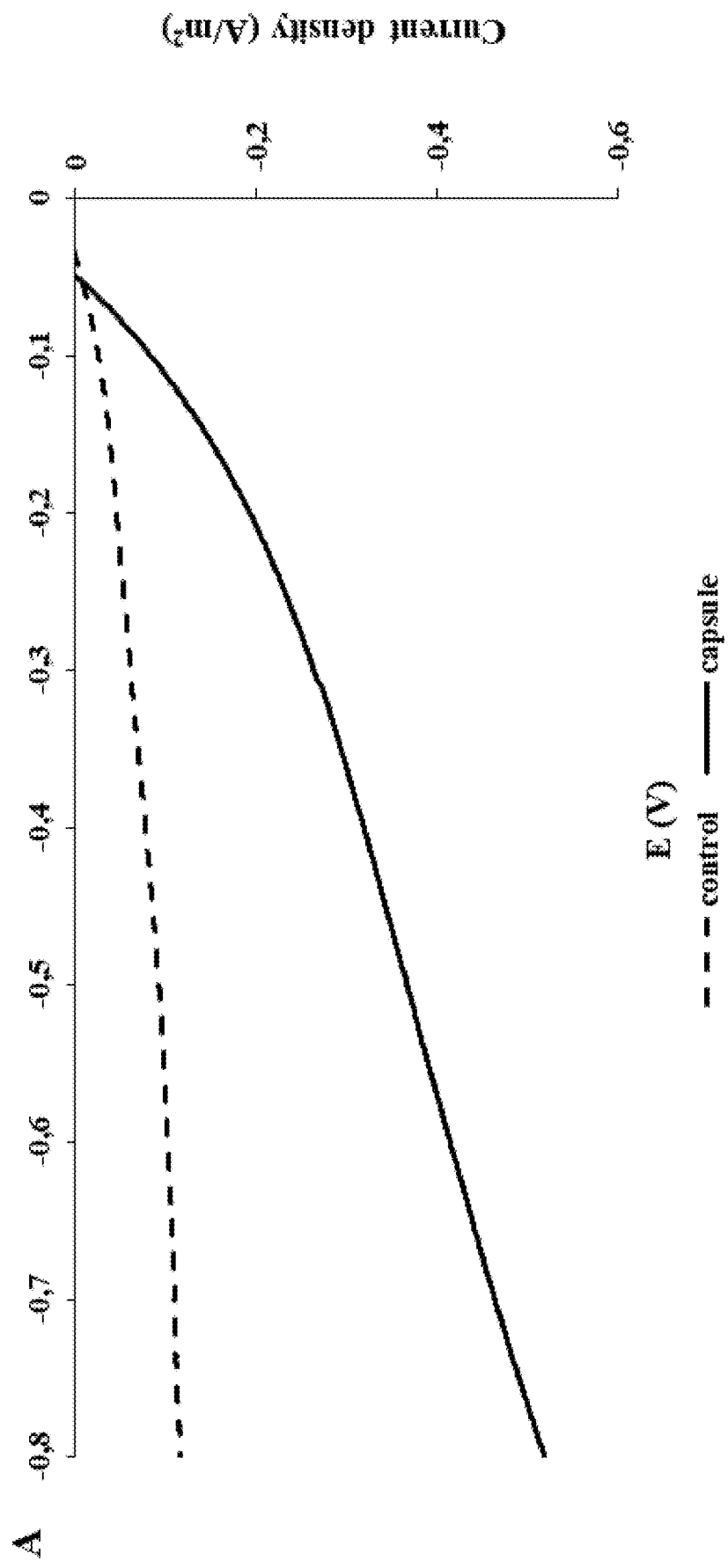
FIGS. 7A-B present graphs of reduction currents of MEC-SBP (black line) and MEC-control (dashed line) which were supplied with acetate as the sole carbon source (FIG. 7A) and artificial wastewater (FIG. 7B). Reduction currents were carried out at a scan rate of 5 mV s$^{-1}$.
Figure 7B:
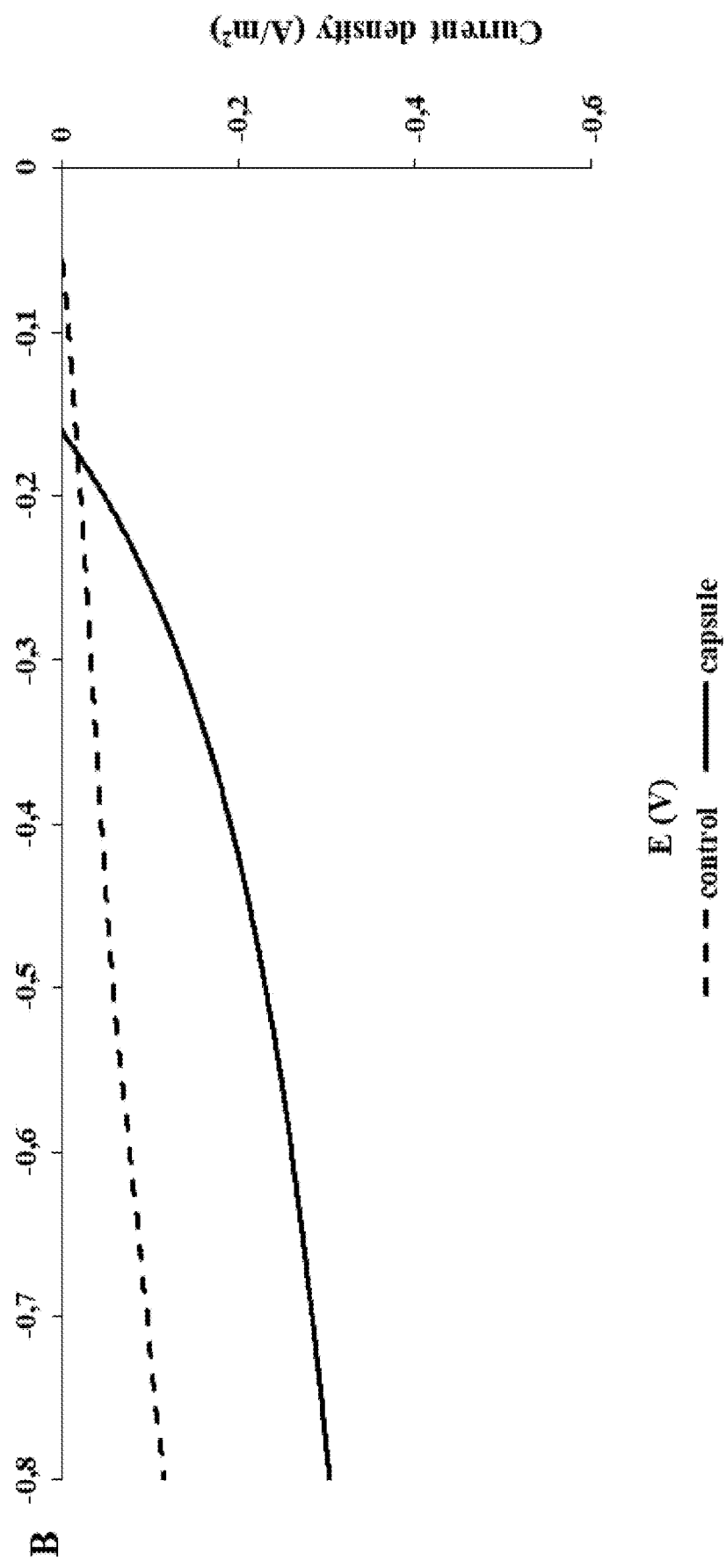

The results in FIGS. 7A-B show that at applied voltages of −0.3--0.8 V, the reduction currents produced by the MEC-SBP were higher compared to MEC-control. This phenomenon was observed when the facilities were supplied with acetate and, more significantly, when the facilities were fed with artificial wastewater. When the MECs were supplied with acetate the reduction currents of the MEC-SBP were −0.42 A m$^{-2}$ (at −0.6 V) while the MEC-control led to −0.10 A m$^{-2}$. While in the presence of artificial wastewater the MEC-SBP produced reduction currents of −0.26 A m$^{-2}$, 3.33 fold compared to the MEC-control.

The HER is calculated for the artificial wastewater treatment according to equations 1-2 given in the methods section. When the MECs were supplied with artificial wastewater, the HER (at 0.6 V) produced by the MEC-SBP were 0.027 and 0.017 $m^3m^{-3}d^{-1}$ and per cubic meter of the MEC liquid volume. While the MEC-control led to only 0.006 and 0.005 $m^3m^{-3}d^{-1}$, respectively.

The hydrogen yield was calculated according to Equations 4-5, for the MEC-SBP and MEC-control, on the 56 day of operation when the facilities were fed with artificial wastewater for 3 weeks. Currents production of wastewater-fed MEC-SBP (ΔCOD of 0.038 g $L^{-1}$) was measured during constant potential operation at 0.8 V. Calculated hydrogen mass yield based per COD consumption is 5.1 g-$H_2$/kg-COD.

Currents production of wastewater-fed MEC-control (ΔCOD of 0.032 g $L^{-1}$) was measured during constant potential operation at 0.8 V. Calculated hydrogen mass yield based per COD consumption is 2.8 g-$H_2$/kg-COD.

To summarize, the hydrogen mass yield based per COD consumption of the MEC-SBP was 44% higher compared to the MEC-control.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. An anode comprising:
   (i) an inner layer encapsulating a conductive material and a microorganism, wherein said inner layer is water soluble;
   (ii) an outer layer comprising a rigid porous membrane, said outer layer encapsulating said inner layer; and
   (iii) a metal conductor, wherein said metal conductor is positioned across said outer layer, said inner layer, and in contact with said conductive material.

2. The anode of claim 1, wherein said rigid porous membrane is substantially water insoluble.

3. The anode of claim 1, wherein said rigid porous membrane is characterized by a pore size between 0.1 µm and 1 µm; and wherein said rigid porous membrane is characterized by a tensile strength between 1 MPa and 100 MPa.

4. The anode of claim 1, wherein said inner layer comprises a water soluble polymer selected from the group consisting of: gelatin, dextran, collagen, alginate, chitosan, agarose, poly ethers, poly vinyl alcohol, carrageenan, agar, and any combination thereof.

5. The anode of claim 1, wherein said rigid porous membrane is selected from the group consisting of: cellulose, cellulose ester, polyethylene glycol (PEG), polyvinyl-alcohol (PVAL), polyethersulfone (PES), cellulose acetate, cellulose nitrate, ethyl cellulose, nitrocellulose mixed esters, polycarbonate film, nylon, poly(vinylidene fluoride) (PVDF), polysulfone, and any combination thereof.

6. The anode of claim 1, wherein said anode is in the form of a particle characterized by a particle size between 0.5 cm and 30 cm.

7. The anode of claim 1, wherein said microorganism is deposited on at least one surface of said conductive material.

8. The anode of claim 1, wherein said microorganism is a genetically modified microorganism; and wherein said genetically modified microorganism is characterized by exoelectrogenic activity.

9. The anode of claim 1, wherein said microorganism is selected from bacteria, archaea, algae, yeast, mold and fungi; and wherein said bacteria comprises a dry culture bacteria, endospores culture bacteria, or viable culture bacteria; optionally wherein said bacteria is an exoelectrogenic bacteria selected from Geobacteraceae, Shewanellaceae, Aeromonadaceae, Alteromonadaceae, Clostridiaceae, Comamonadaceae, Desulfuromonaceae, Enterobacteriaceae, Pasturellaceae, and Pseudomonadaceae.

10. The anode of claim 1, wherein said conductive material comprises a conducting redox polymer, carbon nanotube (CNT), graphene, activated carbon, carbon paper, carbon cloth, carbon felt, carbon wool, carbon foam, graphite, porous graphite, graphite powder, graphite granules, graphite fiber, electron conductive polymers, metal, process stimulators and accelerators, or any combination thereof.

11. The anode of claim 1, comprising at least two of said metal conductor; optionally wherein said at least two of said metal conductor are positioned parallel to each other.

12. The anode of claim 1, wherein said metal conductor comprises silver, copper, gold, platinum, or any combination thereof; and wherein said anode is characterized by an improved electrogenic activity.

13. A microbial electrochemical system comprising the anode of claim 1, and a cathode.

14. The microbial electrochemical system of claim 13 comprising more than 2 of said anode, wherein said anode are in contact through said metal conductor; and wherein said microbial electrochemical system comprises a single-chamber or a dual chamber.

15. The microbial electrochemical system of claim 13, for wastewater (WW) treatment, waste treatment, electricity generation, energy generation, hydrogen production, or any combination thereof; wherein said microbial electrochemical system is characterized by any of: (i) an improved chemical oxygen demand (COD) removal capacity, and (ii) chemical oxygen demand (COD) removal in the range of 30% to 99%.

16. A method comprising:
   (i) providing the microbial electrochemical system of claim 13;
   (ii) contacting said microbial electrochemical system with a carbon source; and
   (iii) providing an electric current to said microbial electrochemical system.

17. The method of claim 16, for WW treatment, water treatment, waste treatment, hydrogen production, electricity generation, or any combination thereof; optionally wherein said microbial electrochemical system is characterized by COD removal in the range of 30% to 99%.

18. The method of claim 16, further comprising a step preceding step (ii), comprising contacting said anode with an aqueous solution, thereby activating said anode.

19. The method of claim 16, wherein said anode is substantially devoid of said inner layer.

20. The method of claim 16, wherein said carbon source comprises wastewater, acetate, acetic acid, citric acid, citrate, or any combination thereof.

* * * * *